(12) United States Patent
Hooper et al.

(10) Patent No.: US 7,478,238 B2
(45) Date of Patent: Jan. 13, 2009

(54) ACCESS CONTROL FOR DIGITAL VIDEO STREAM DATA

(75) Inventors: Daniel Luke Hooper, Basingstoke (GB); Andrew Robert Taylor, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 874 days.

(21) Appl. No.: 10/903,237

(22) Filed: Jul. 30, 2004

(65) Prior Publication Data

US 2005/0028192 A1 Feb. 3, 2005

(30) Foreign Application Priority Data

Jul. 31, 2003 (GB) ................... 0317963.7

(51) Int. Cl.
*G06F 9/00* (2006.01)
(52) U.S. Cl. ............... 713/165; 713/189; 380/217; 380/285; 380/277
(58) Field of Classification Search .......... 713/189, 713/165; 380/217, 285, 277
See application file for complete search history.

(56) References Cited

U.S. PATENT DOCUMENTS

2002/0196939 A1  12/2002  Unger et al.

FOREIGN PATENT DOCUMENTS

| EP | 0 674 440 | 10/1996 |
|----|-----------|---------|
| GB | 2 382 753 | 6/2003 |
| GB | 2 387 518 | 10/2003 |
| WO | WO 02/15579 | 2/2002 |

*Primary Examiner*—Thomas R Peeso
(74) *Attorney, Agent, or Firm*—Oblon, Spivak, McClelland, Maier & Neustadt, P.C.

(57) ABSTRACT

A data encryption apparatus operable to apply encryption to input data having at least a format identifying portion and a payload portion comprises means for discriminating between the format identifying portion of the input data and the payload portion of the input data; and means for selectively applying encryption to the input data in dependence upon an output of the discriminating means so as to encrypt at least a part of the payload portion of the input data but not to encrypt the format identifying portion. A corresponding decryption apparatus is also provided.

17 Claims, 27 Drawing Sheets

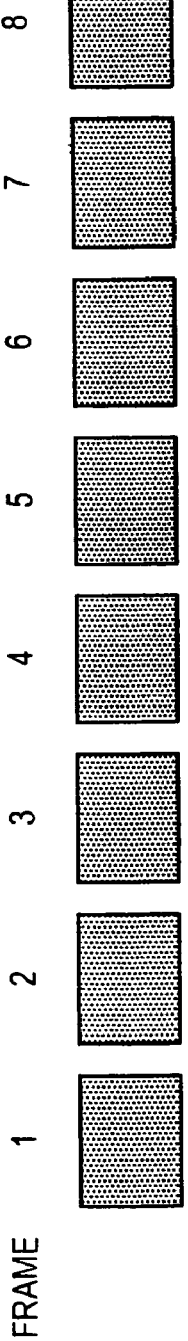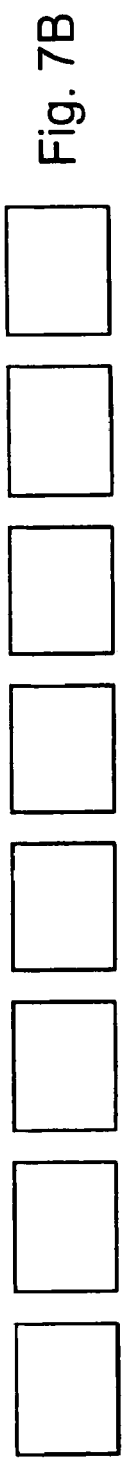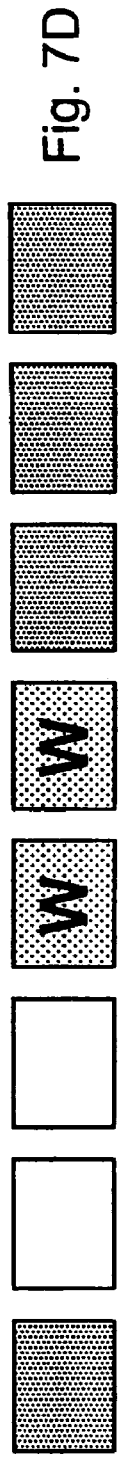

ACCESS CONTROL FOR DIGITAL VIDEO STREAM DATA

BACKGROUND OF THE INVENTION

1. Field of the Invention

This invention relates to access control for digital video stream data, such as so-called video elementary stream data. In addition to the video stream data, the invention may optionally be used in respect of at least one of audio content, metadata content, text content, image content and so on, for example audio/visual content.

2. Description of the Prior Art

The growth of new digital infrastructures, including digital devices and high-speed networks, combined with increasing processor power is making video content creation, manipulation and distribution both simpler and faster. While this greatly aids legitimate usage of the content, a disadvantage is that unauthorised abuse of such content (particularly copyright content), such as unauthorised reproduction or distribution, is also becoming easier and more damaging to the content owner.

The situation is made more complicated in that commercial considerations may require the content owner to allow a potential customer to see or use the content in a trial situation before committing to purchase rights to use the content from the owner.

So-called digital rights management (DRM) systems have been proposed, in order to try to address these problems. Known DRM systems generally use a form of data encryption to encrypt content for distribution. An authorised recipient is supplied with a decryption key to allow the recipient to decrypt the encrypted content.

SUMMARY OF THE INVENTION

This invention provides a data encryption apparatus operable to apply encryption to input data having at least a format identifying portion and a payload portion, the apparatus comprising:

means for discriminating between the format identifying portion of the input data and the payload portion of the input data; and means for selectively applying encryption to the input data in dependence upon an output of the discriminating means so as to encrypt at least a part of the payload portion of the input data but not to encrypt the format identifying portion.

The invention recognises that the content which is encrypted under a DRM scheme may conform to a particular data format. For example, video data to be encrypted may conform to a format such as the MPEG 2 format, in which the data is organised as successive frames of data. The frames can be of variable length and so each frame is distinguished by a format identifying portion referred to as header data.

If encryption were applied to the whole of the video data, it would become impossible to distinguish the start of each frame because the particular data patterns used to indicate the header data would be scrambled. This is not a problem in previous encryption schemes, where a data file is encrypted or decrypted as a whole. However, the invention recognises that it may be desirable to allow selective decryption of subsections of an encrypted data file, or to allow separate distribution of subsections of the encrypted data.

To address this need, the invention involves the counter-intuitive step of not encrypting a part of the data file, namely the format identifying data such as header data. In the case of an MPEG2 video file or stream, this enables frame boundaries to be identified. As well as addressing the needs described above, this also allows the encrypted data to be fed to a conventional MPEG 2 video decoder/player. While the displayed pictures will be scrambled, the player is at least able to keep a correct track of the frame boundaries. A further requirement of the decoder is that within the picture data, slice start codes remain unencrypted.

So, in the example of a selective decryption scheme, where subsections of the encrypted data are decrypted, the MPEG 2 video decoder/player would be able to replay encrypted and decrypted subsections without introducing frame boundary errors. The unencrypted format identifying data need not be decrypted. This format identifying data may be used to identify frame boundaries, even for those frames that have not been selectively decrypted.

Further respective aspects and features of the invention are defined in the appended claims.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 7A to D schematically illustrate a set of selective access permissions for three different users;

DESCRIPTION OF THE PREFERRED EMBODIMENTS

In the examples which follow, various types of content will be discussed. However, it will be appreciated that all of these techniques are applicable to video stream data, such as so-called video elementary stream data.

Figure 1:
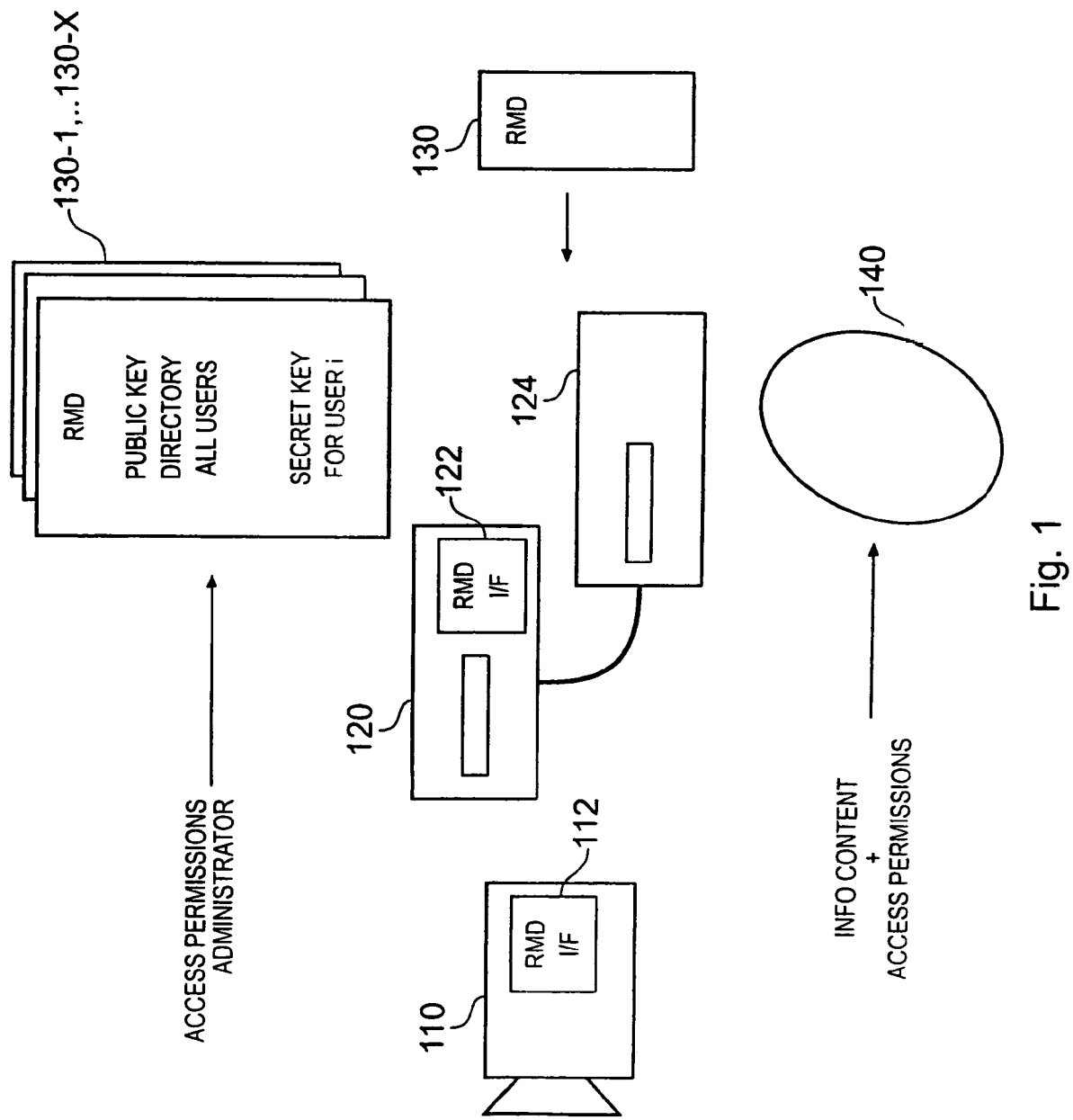
FIG. 1 schematically illustrates an access control system for digital content according to the present technique.

FIG. 1 schematically illustrates an access control system for digital data content according to the present technique. The system comprises: a camera 110 for capturing and recording digital image data on a recording medium such as a disc or video tape; a playback device 120 for playback of the recorded image data; a recording device 124 to enable reproduction by copying as well as playback of digitally recorded image data; an access control memory device 130 (which is a removable memory device in this embodiment); and a disc-based storage medium 140. Both the camera 110 and the playback device 120 have an interface via which a connection with the removable memory device can be formed. The camera is capable of capturing stills and/or moving images. The system provides selective access to encrypted content stored on the storage medium 140 so that different users and/or user groups may be granted access to different portions of the decrypted information content.

There are two main alternative cryptographic schemes for encrypting/decrypting information content: symmetric key cryptography and asymmetric key cryptography. In symmetric key cryptography the key used to decrypt the information is the same as (or easily derivable from) the key used to encrypt the information. However, in asymmetric key cryptography the key used for decryption differs from that used for encryption and it should be computationally infeasible to deduce one key from the other. For asymmetric cryptography a public key/private key pair is generated, the public key (which need not be kept secret) being used to encrypt information and the private key (which must remain secret) being used to decrypt the information. An example of an asymmetric cryptography algorithm that may be used is the RSA algorithm. The RSA algorithm relies on a one-way function. The public key X is a product of two large prime numbers p and q, which together form the private key. The public key is inserted into the one-way function during the encryption process to obtain a specific one-way function tailored to the recipient's public key. The specific one-way function is used to encrypt a message. The recipient can reverse the specific one-way function only via knowledge of the private key (p and q). Note that X must be large enough so that it is infeasible to deduce p and q from a knowledge of X alone.

An alternative asymmetric encryption scheme to RSA is elliptical curve cryptography (ECC). Rather than generating keys as the product of very large prime number as in the case of RSA, ECC generates keys through properties of an elliptic curve equation. ECC is likely to be faster at key generation than RSA and hence is the preferred asymmetric encryption technique for the present arrangement. The information content stored on the storage medium 140 is symmetrically encrypted using one or more content encryption keys (CEKs) and the CEKs are asymmetrically encrypted using a public key/private key pair. In alternative embodiments the information content may be asymmetrically encrypted. The CEKs are generated according to a binary tree encryption scheme as described in detail below with reference to FIG. 8 and are updated on a regular basis, e.g. every 10 seconds, so that different portions of encrypted information content correspond to different subsets of the CEKs. This allows for selective accessibility of the decrypted information content. Symmetric encryption is used for encryption of the information content because it is less numerically intensive and hence quicker than asymmetric encryption.

In this embodiment each user and/or user group is provided with a secure removable memory device 130 that stores a user directory, which lists for each of a plurality of users and a public key that can be used to encrypt a subset of CEKs. In alternative embodiments the memory device on which the public keys and/or private keys are stored may be fixed (e.g. in the camera) rather than removable. Thus the user has access to the portion of the information content to which the subset of CEKs correspond. The removable memory device (RMD) also stores a private key for the user or user group to whom the RMD belongs.

The access permissions to the recorded information content may be centrally administered by an administrator who is authorised to issue RMDs to new users and to remove authorisation for existing users as required. For each new authorised user a public key/private key pair must be generated and the private key for that user is stored on their RMD. The new user is also added to the user directory stored on his RMD. The user directory has a tag to indicate the version number so that each time new users are added or removed the version number can be incremented.

The information on the RMD must be securely stored to prevent unauthorised copying of the information stored thereon. It is particularly important to prevent unauthorised access to the private key. Examples of secure memory devices appropriate for use with the present arrangement are smart cards, Sony™ Magic Gate™ Memory Stick™ storage devices and Secure Digital Cards, in which case the interface may conveniently be in the form of a generally RMD-shaped slot into which the RMD is inserted. The operation of Magic Gate™ systems is explained in detail below with reference to FIGS. 18 to 20.

The RMD may be used only to store data including the user directory and RMD owner data. However, in alternative embodiments the RMD may have an on-board data processing module operable to perform encryption and/or decryption. Accordingly, at least some encryption of the data content and/or encryption processing for the purpose of generating the content access control data could be performed by the data processing module on the RMD. Similarly decryption of the data content or content access control data may be performed at least in part by the data processing module of the RMD. Furthermore, the connection between the removable memory device and the equipment may be via a physical connection or a wireless interface. The removable memory device may comprise a data processing module operable to perform encryption of the input data content to generate content access control data.

The symmetrically encrypted information content and the asymmetrically encrypted CEKs are stored on the recording medium 140. In this example arrangement the recording medium is a disc-based recording medium such as a compact disc CD, digital versatile disc DVD, optical disc or high-density disc that uses Blu-Ray™ technology. However, it will be appreciated that other types of recording media such as tape-based media could alternatively be used. Since access to decrypted portions of the information content is dependent on the capability to decrypt the CEKs associated with those portions, different authorised users have access to different decrypted portions of the information content.

During recording of the information content in the camera 110, the RMD of the camera operator is inserted in the camera RMD interface 112. The CEKs used for symmetric encryption of the captured image data are asymmetrically encoded using the public keys for each of the authorised users who is to be given access to the image data. The public keys are derived from the user directory on the cameraman's memory card. In this embodiment the public keys themselves are stored on the memory card although alternatively they may be stored for example as hashed values (the hash being reversible to recover the key) or as a look-up table. A hash of a data set is a fixed-length bit-string that is pseudo-randomly derived from the data. The private key may also be stored directly, in a look-up table or as a hashed value. During playback the RMD 130 of an authorised user is inserted in the playback device RMD interface 122 and the user's private key is used to decrypt the CEK's that have been stored on the disc storage medium 140 using that user's corresponding public key. Once the appropriate CEKs have been decrypted, the corresponding information content can be decrypted using those CEKs. An attempt may be made to copy the disc in the replay device 120 using the recording device 124. The recording device 124 and the playback device 120 have a common RMD interface 122. The RMD provides access control to content on the storage medium but copying of the decrypted information content is possible using the recording device (indeed any recording device). It is assumed that the environment in which the decrypted information content is manipulated is a secure environment. This has the advantage of allowing the workflow of video editors to be relatively unimpeded by the access control system. For example, the newly copied version may allow access only to the user by whom it was copied. Alternatively, the newly copied version may have recorded access permissions (via the different encrypted versions of the CEKs stored thereon) so that all of the users who had access to the original copy will also have access to the newly copied version.

Figure 2:
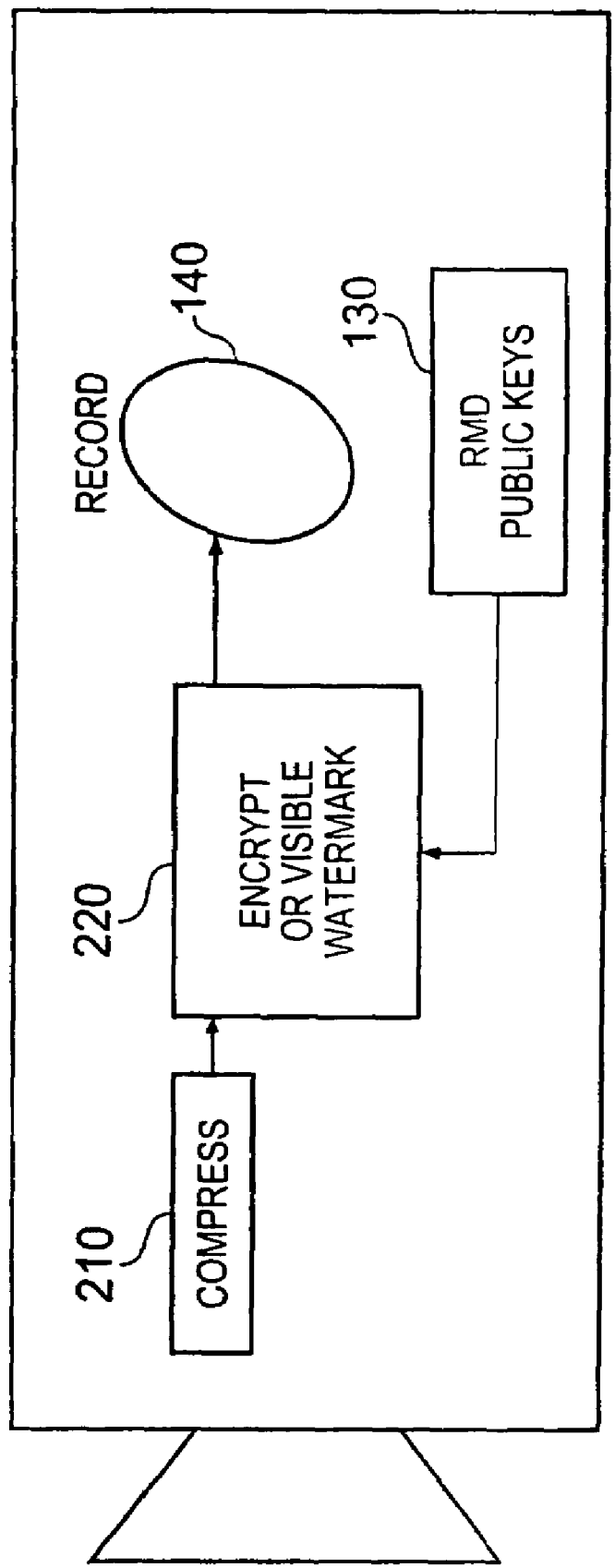
FIG. 2 schematically illustrates a recording process in the camera of FIG. 1.

FIG. 2 schematically illustrates a recording process in the camera 110 according to the present technique. In this arrangement the captured audio-visual (AV) information is compressed by a compression engine 210 and the compressed AV data is then supplied to an encryption engine where it is symmetrically encrypted using an Advanced Encryption Standard (AES) algorithm. Typical compressed data rates. (e.g. 25 Mbps for DVCam compression or 50 Mbps for IMX compression) are readily handled by the encryption engine 220. A form of encryption known as visible watermarking may also be used on the compressed data, either in addition to or as an alternative to the AES symmetric encryption.

Visible watermarking is a process that involves applying a visible modification to image material using an invertible algorithm so as to impair the material. The visible modification is applied to selected portions of image/video data, for example, so as to cause a visible 'logo' to appear in the content. The portion of the image to be modified is defined by a bit-map or change template. The modification process may involve, for example, changes to certain Discrete Cosine Transform (DCT) coefficients of a transformed image. The visible watermark allows users to preview the content in a secure manner (i.e. without permitting direct access to unimpaired content). The image modifications are performed in a cryptographically secure manner and are completely reversible so that access to a decryption key known as a "washing key" allows the original content to be restored bit-for-bit. Both visible watermarking and symmetric/asymmetric encryption may be applied to an image. A first level of access permission may allow the user to decrypt the image but not to wash the watermark whereas a second, further level of access may involve supplying the user with the washing key to allow subsequent removal of the visible watermark from the image. The provision of the washing key may be subject to, for example, payment of a fee by the user.

The encryption engine 220 generates the CEKs according to the binary tree encryption scheme. The symmetric CEKs are asymmetrically encrypted according to the public keys of each of a plurality of authorised users. The public keys are obtained from the user directory of public keys on the RMD 130 that is currently connected to the camera. Different subsets of CEKs corresponding to different portions of encrypted AV data may be asymmetrically encrypted for each authorised user in dependence upon their respective access permissions. The asymmetrically encrypted CEKs for each of the plurality of users are recorded on the storage medium 140 along with a single copy of the symmetrically encrypted AV information content. The asymmetric encryption could be performed either in circuitry of the RMD itself (e.g. by a smart card processor) or in the encryption engine of the camera 110 itself.

Figure 3:
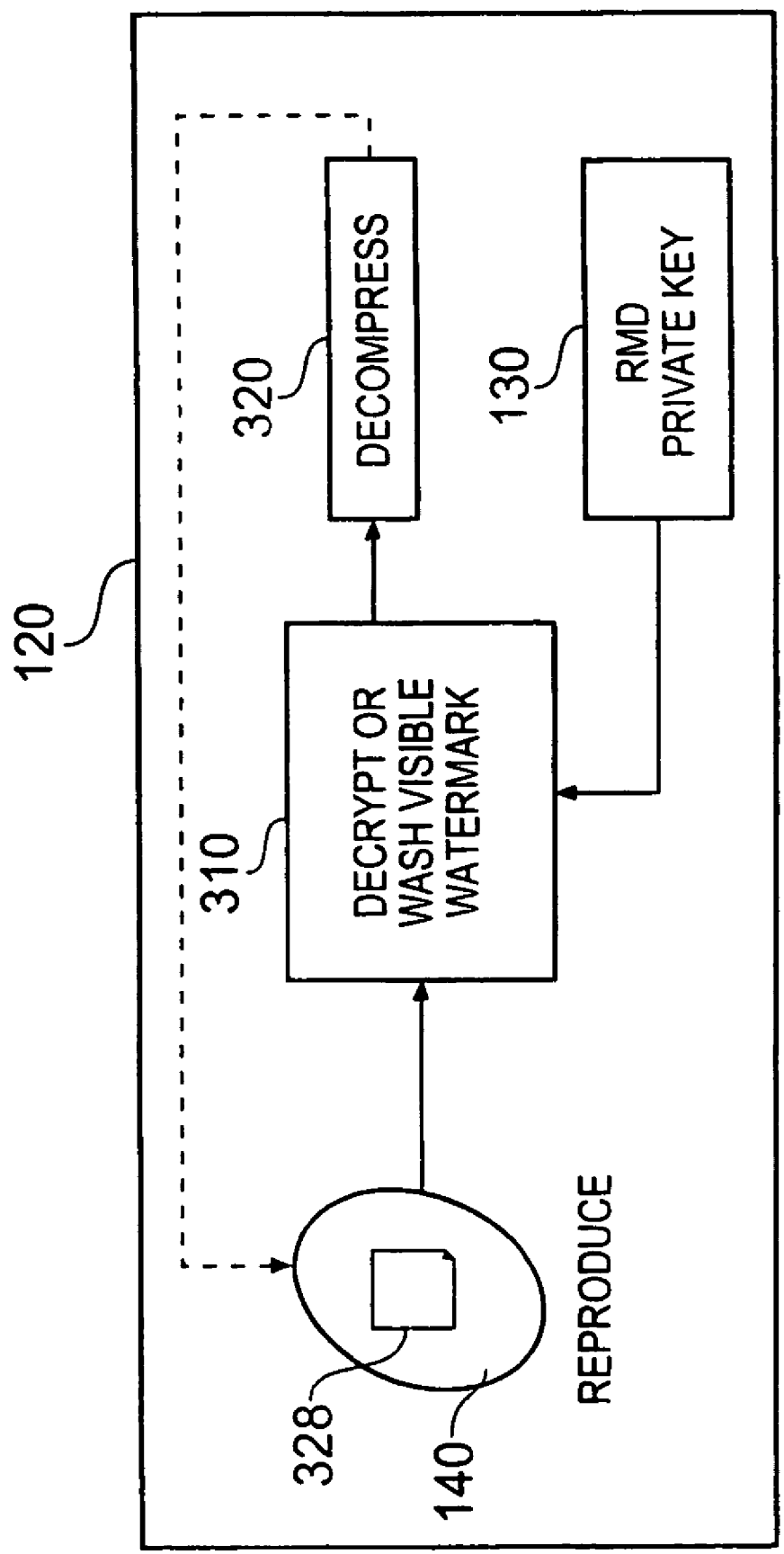
FIG. 3 schematically illustrates a reproduction process in the playback device of FIG. 1.

FIG. 3 schematically illustrates a reproduction process that occurs in the playback device 120 according to the present technique. The symmetrically encrypted compressed information content and asymmetrically encrypted CEKs are read from the recording medium 140 and supplied to a decryption engine 310. The authorised user has inserted the RMD in the RMD interface 122 of the playback device and the decryption engine 310 accesses the private key stored thereon to decrypt at least a portion of the AV content. The portion of the AV content (for example a certain subset of frames, shots or scenes) that is accessible to the authorised user depends upon the subset of CEKs that was encrypted using their public key and stored on the recording medium. When a user decrypts the protected content using the playback device 120, an option is available to that user to save the resulting "de-protected" information content back to the disk 140 or to a new disc. In this embodiment it is assumed that the playback device is also operable to record. A data package 328 is recorded to disk 140 along with the decrypted information content. The data package 328 details the access permissions as held by the users in the source data package. When a user, who may or may not be the user who has recorded the decrypted content to disk, attempts to access the information content stored on the disk, that user may have permission to access at least some of the content that has been de-protected and recorded in the de-protected format. If the playback device were simply to decrypt the frames that the user selects for viewing (selected from the subset of frames to which they have access permission) then it is possible that if that selected frame set includes given frames that have already been de-protected and recorded then those given frames could be de-crypted for a second time leaving the information content scrambled. This is avoided by including in the data package 328, a de-protection information list detailing individual frames or frame ranges that have been recorded in de-protected format. The de-protection information list is used to ensure that the second decryption is not performed when the given frames are requested for viewing by authorised users. The de-protection information list is updated each time a user records de-protected frames to disk.

Figure 4:
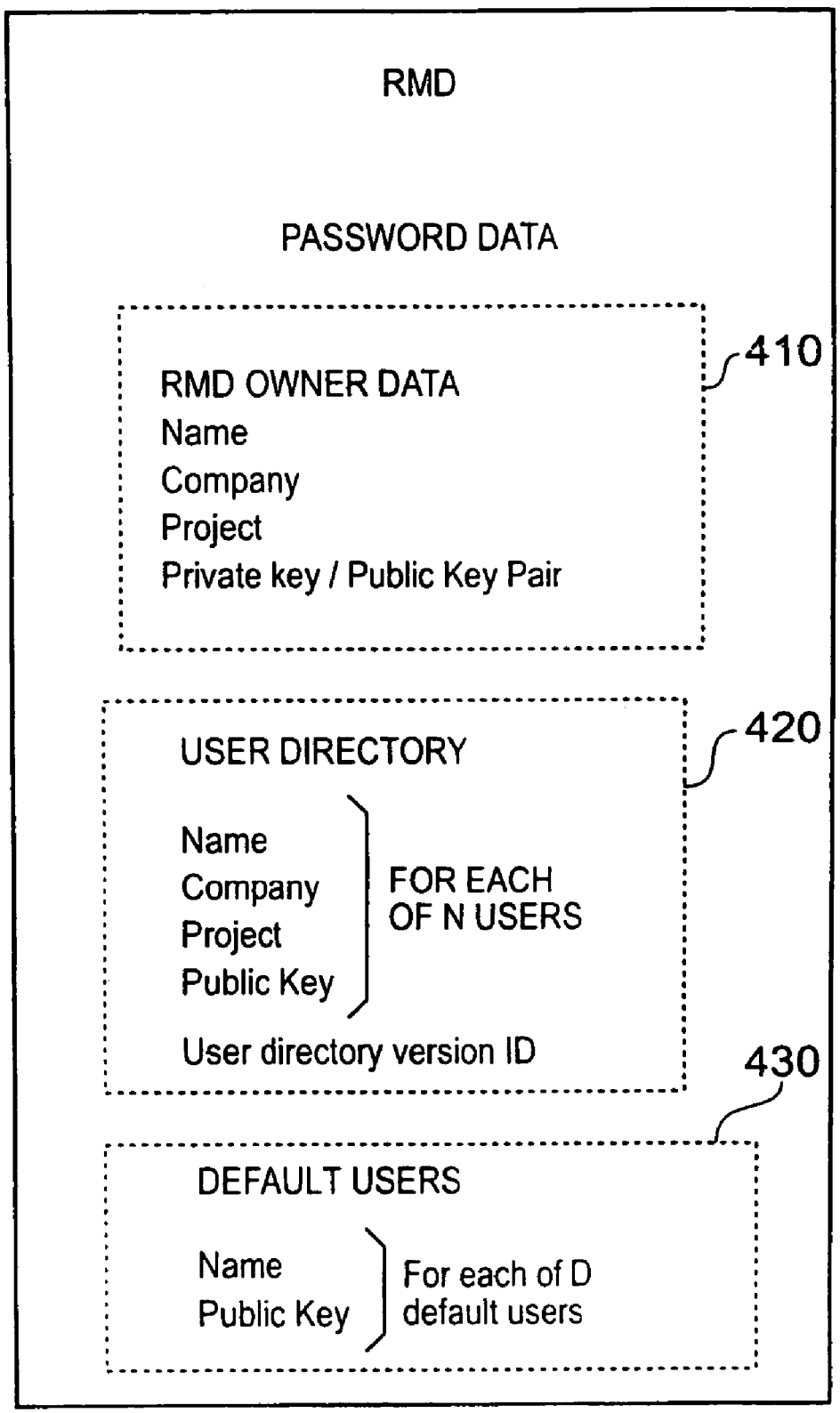
FIG. 4 schematically illustrates a set of information that is stored on the removable memory device of FIG. 1.

FIG. 4 schematically illustrates a typical set of information that is stored on the RMD 130. The information is stored on the RMD as one or more XML files. XML is a markup language. The familiar markup language Hypertext Markup Language (HTML) provides instructions to a web browser on how to display a web page's text and images by defining document structure in terms of headings and titles and its presentation in terms of e.g. captions and fonts. By way of contrast, XML provides ways both to define common information formats and to share these formats and associated data on the Web and on intranets. While HTML is restricted to defining how text and information can be displayed and interacted with, XML can give contextual information about a document's contents by allowing application developers to define custom tags which mark sections or words in a document as belonging to a specific data category, e.g. the tags <NAME> and <PUBLIC KEY> could be defined for use in the user directory on the RMD 130. Data processing tasks can be performed on the XML documents by making use of the custom tags to identify and selectively extract information.

As shown in FIG. 4 the information stored on the RMD includes password data, a set of RMD owner-data 410, a user directory 420 and a set of default user data 430. The RMD owner data 410 comprises the name of the authorised user, the company with which they are associated, the project to which they have been assigned and a private key/public key pair. Note that as a minimum an identifier e.g. name of the authorised user and the asymmetric keys must be stored, the other data such as company and project being optional. The user directory 420 comprises a set of data for each of a plurality N of users. Access to the decrypted information may be provided to one or more of the users listed in the user directory in dependence upon the access permissions allocated to them. In this case each entry in the user directory comprises the name, company and project associated with the authorised user together with the value of their public key. The public key is used to encrypt the CEKs that are required to decrypt the information content to which that user is to be given access permission. Since the user directory will be regularly updated to add and/or remove authorised users, a user directory version ID tag is also stored to facilitate comparison of and updating of user directories. The updating is performed by comparing a local copy of the user directory stored on the camera 110 and/or playback device 120 with the external copy of the user directory stored on the RMD 130 to determine if one of the local or external user directories has been more recently updated and, if so, updating of the user identifiers, public keys and version ID tag of the less recently updated user directory is performed.

The set of default user data 430 comprises a name and associated public key for each of D default users. There may be any number of default users or there may be no default users for this particular RMD owner. The default user has access to all of a predetermined set of information content (see description of FIG. 11B below). Any user may be selected as a default user. The set of default user data 430 contains a list of default users specific to the RMD owner, for example the manager or supervisor of an RMD owner may be listed as one of his default users. The administrator is responsible for deciding which users are allocated default user status. When information content is created the full set of CEKs associated with that information content are always encrypted using the default user public keys and stored on the recording medium to guarantee access to all of the content by the default user(s). The default user provides a safeguard against inadvertent loss of RMDs since access to the decrypted information content is guaranteed to the default user(s).

The password data is associated with the RMD owner and may be used as an extra level of security in encoding the CEKs, for example, the CEKs could be combined with the password prior to being asymmetrically encrypted. In this particular embodiment the users are required to log in to the system using a password corresponding to that stored in the password data on their RMD 130. Although in the embodiment of FIG. 4, the user directory is stored on the RMD in alternative embodiments the entire user directory or at least the list of public keys of the user directory may be stored in fixed (i.e. non-removable) memory within the camera 110 or playback device 120. If the public keys of the user directory are stored in fixed memory in the camera or playback device then the RMD, which stores the private key of the user or user group, may store identification data associating that RMD with a respective public key held by the camera or playback device. In yet further alternative embodiments copies of the user directory may be stored in both the recording/reproduction equipment and on RMDs.

Now consider an example embodiment in which there is no RMD at all and the private keys are stored in memory within the devices. Such an example embodiment comprises five remote cameras and a production facility. In this case all of the production facility equipment shares a common public key/private key pair, the common private key being stored in fixed memory in each piece of production facility equipment. Each of the five cameras has a fixed access control memory device storing a respective public key/private key pair (a different key pair being associated with each camera). In this example each camera is considered to be a "user". The captured data content is encrypted in dependence upon both the common public key and the public key of the camera being used to capture the data content. This means that access to the captured data content is available "in the field" at the point of capture yet the data content is secured against unauthorised access while in transit back to the production facility. At the production facility the data content may be accessed for editing using the common private key.

Figure 5:
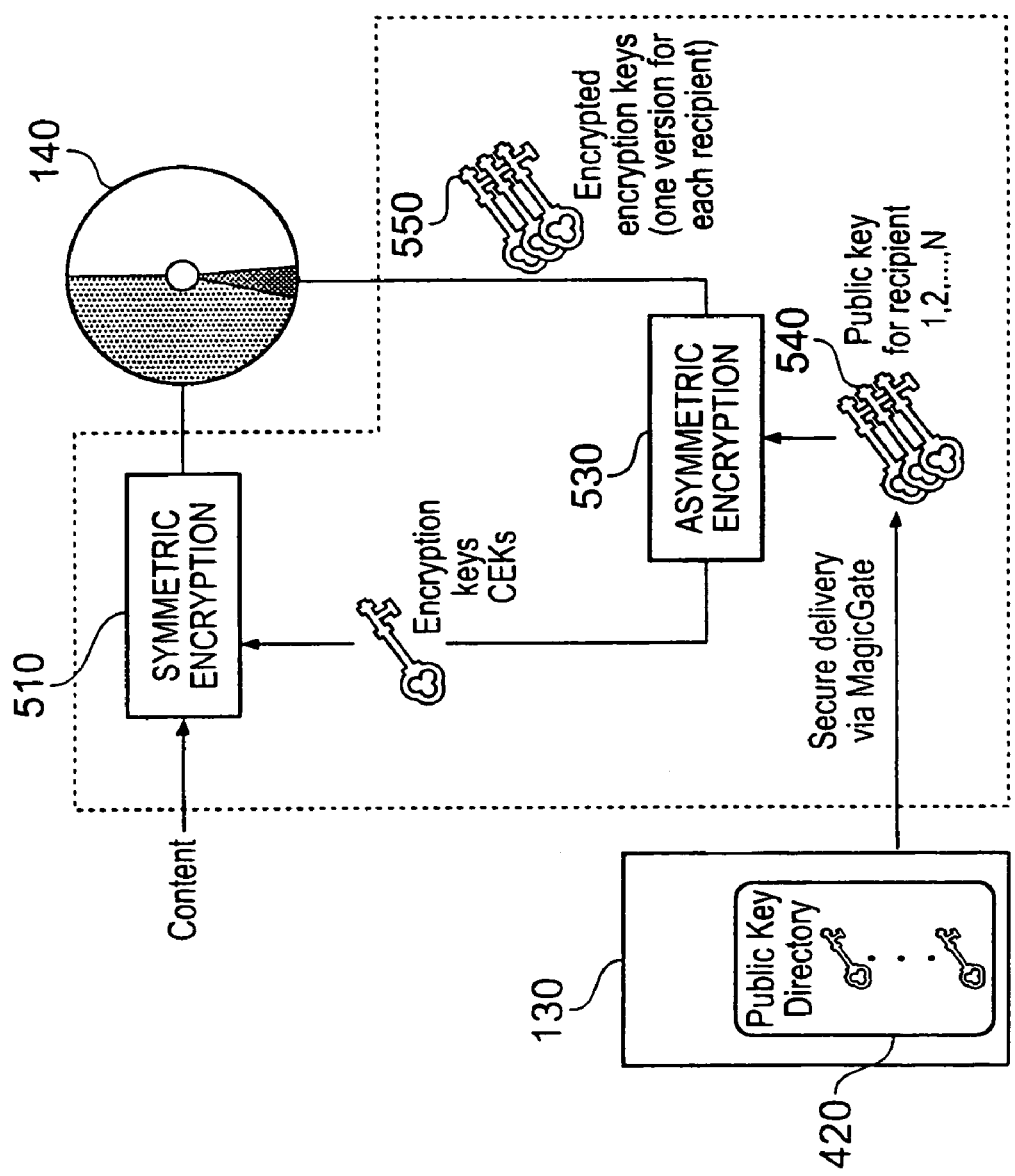
FIG. 5 schematically illustrates a first encryption scheme according to the present technique.

FIG. 5 schematically illustrates a first encryption scheme according to the present technique. According to this scheme, the information content is symmetrically encrypted at stage 510 using one or more content encryption keys 520. The symmetrically encrypted information content is stored on the disc-based recording medium 140. At stage 530 the content encryption keys 520 are asymmetrically encrypted using each of a plurality of public keys corresponding to a respective plurality of recipients. The public keys are read from the user directory 420 of the RMD 130. The output of the asymmetric encryption stage 530 is a set of encrypted content encryption keys 550. There is one version of encrypted content encryption keys for each recipient since each recipient is associated with a respective public key from the user directory 420. The encrypted content encryption keys are stored on the disc-based recording medium 140 along with the symmetrically encrypted information.

Figure 6:
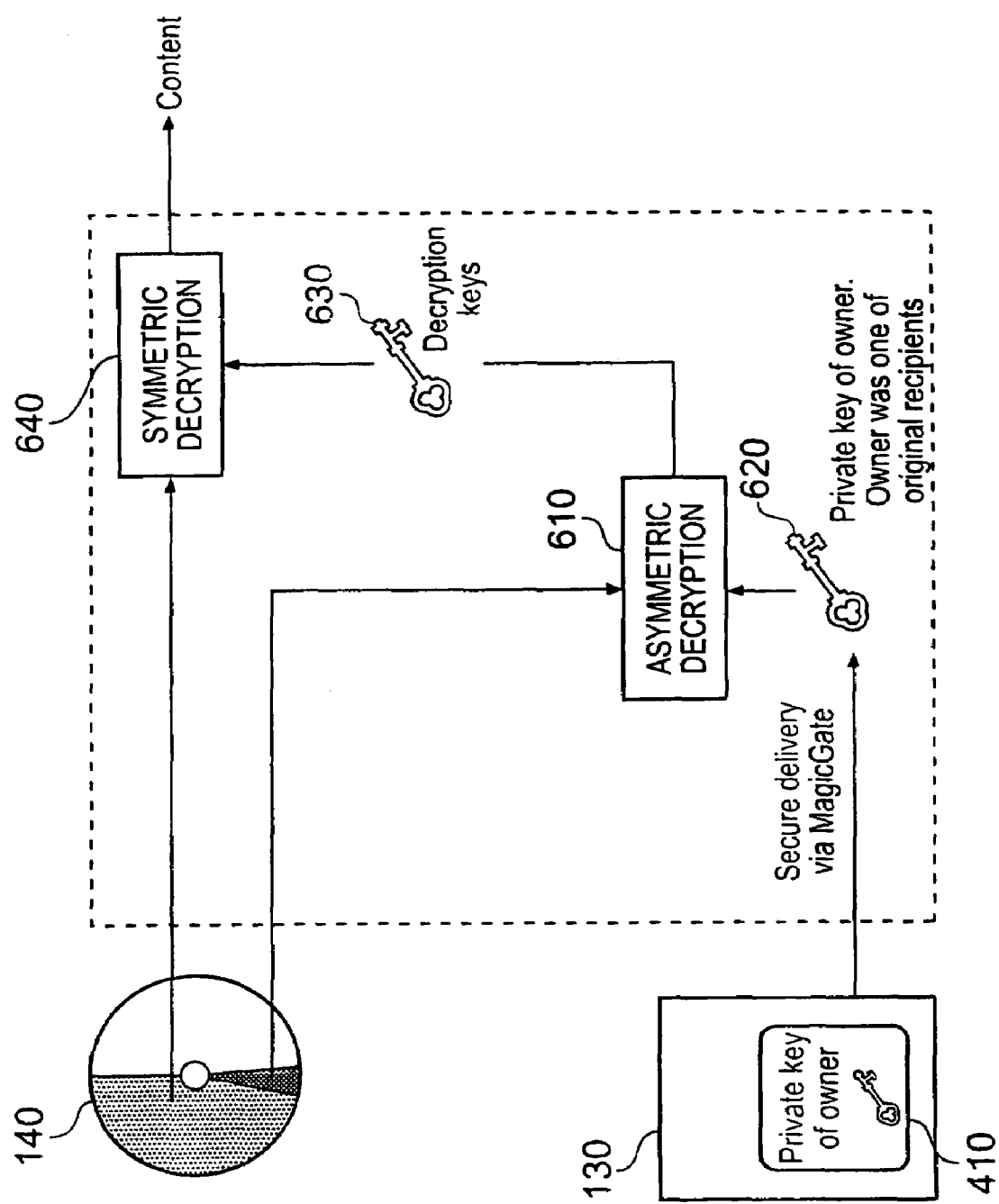
FIG. 6 schematically illustrates a decryption scheme corresponding to the encryption scheme of FIG. 5.

FIG. 6 schematically illustrates a first decryption scheme corresponding to the encryption scheme of FIG. 5. The first stage of decryption involves reading the encrypted content encryption keys 550 (see FIG. 5) from the recording medium 140. The private key 620 associated with the owner of the RMD 130 is read from the RMD owner data 410 and at stage 610 the version of the encrypted content encryption keys 550 that was encrypted using the public key that corresponds to the available private key is asymmetrically decrypted. The output of the asymmetric decryption stage 610 is a set of content encryption/decryption keys 630 appropriate to the access permissions of the RMD owner. These content encryption keys are used to perform symmetric decryption of at least a portion of the encrypted content read from the recording medium 140.

FIGS. 7A to D schematically illustrate an example of a set of selective access permissions for three different users. FIG. 7A shows eight image frames representing the information content stored on the disc 140. Each of the eight image frames is both encrypted and visibly watermarked (represented by shaded frames). FIG. 7B illustrates the access permissions of the content owner, and in this case all of the frames are unshaded indicating that the owner is authorised to view the decrypted content of all image frames. FIG. 7C represents the permissions granted to a person B by the content owner. The frames marked with 'W' (frames 4 and 5) are decrypted but visibly watermarked frames whereas the unshaded frames 1, 2, 3 and 6 are both watermark washed and decrypted. FIG. 7D shows a subset of permissions granted to a person C by person B. Clearly, person B cannot grant access to frames 7 and 8 for which he has no access permissions. Person C is granted full access to frames 2 and 3 as well as access to a decrypted but watermarked frames 4 and 5. However access to frames 1 and 6 is not passed on from person B to person C. The access permissions are effectively stored on the recording medium 140 since they are determined by the subset of content encryption keys to which the user is given access via his public key. Access permissions may also be allocated according to a user group such as a team of cameramen or a group of editors rather than to an individual user. Access to a given subset of frames can be effected by the cryptography scheme and in this arrangement a hierarchical binary tree cryptography scheme is used.

Figure 8:
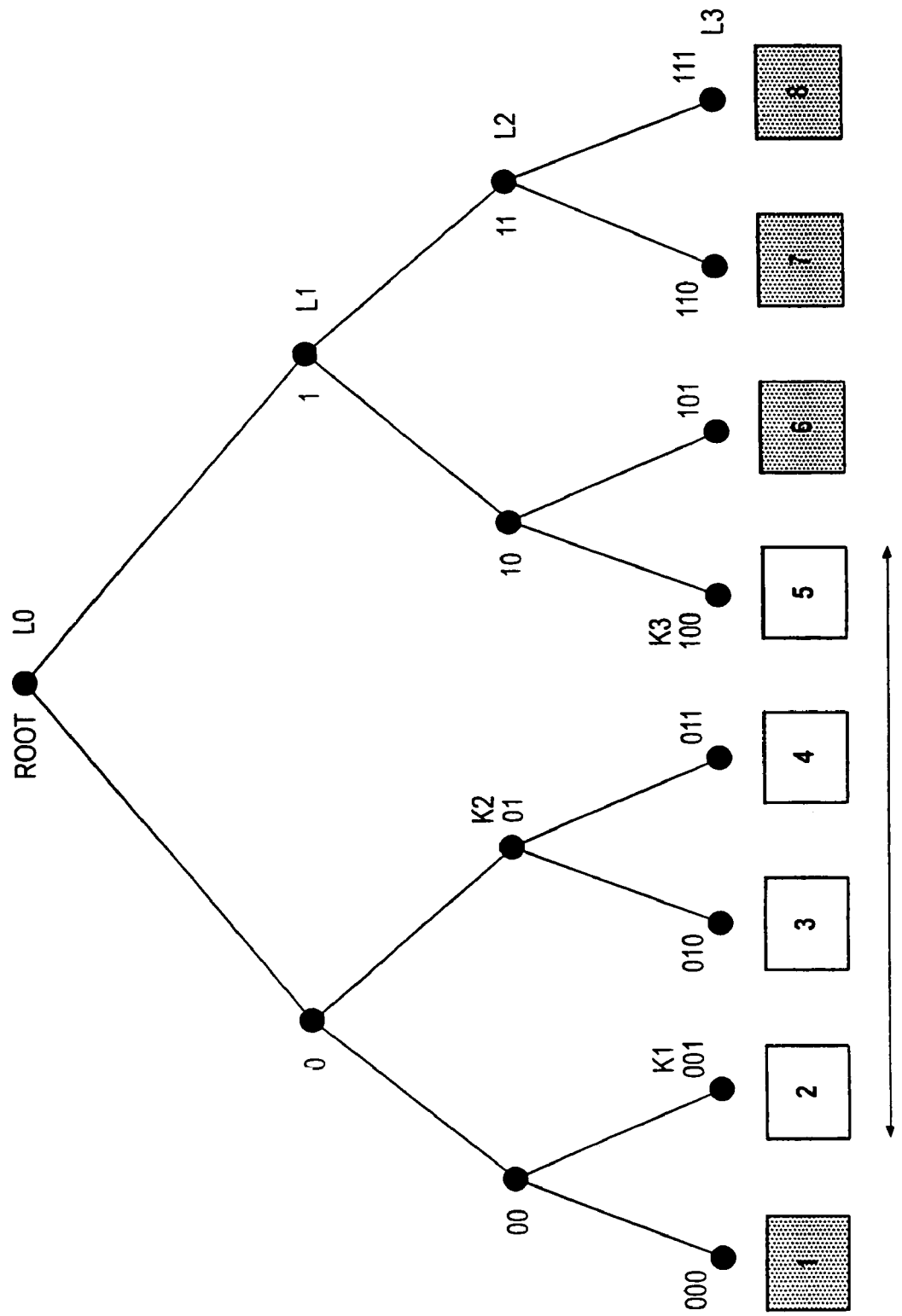
FIG. 8 schematically illustrates a binary tree cryptography scheme in which different keys are associated with different information portions.

FIG. 8 schematically illustrates the hierarchical cryptography scheme used according to the present technique to provide selective access to portions of the decrypted information content. As shown in FIG. 8 the encryption scheme can be represented as a binary tree having a plurality L of hierarchical levels. In this case four hierarchical levels L0, L1, L2 and L3 are shown. The eight nodes at level L3 correspond to the eight picture frames of FIG. 7D. With the exception of the root node at L0, each node in level Lj (j=1, 2, 3) has a single branch to a node at a higher hierarchical level L(j−1) and two branches to respective nodes in the next lowest hierarchical level L(j+1) and each hierarchical level has $2^j$ nodes. Each node of the binary tree of FIG. 8 has been labelled according to the branch from which it emanates i.e. a binary 0 for the left-hand branch and a binary 1 for the right-hand branch. Each node is identified by a 2j-bit code defined by the sequence of branch labels leading from the root to that node. The encryption engine 220 in the recording device 110 commences the encryption process at level L0 where an encryption code comprising a key and initialisation vector are generated according to known techniques. The two L1 encryption codes are generated in dependence upon the L0 encryption code and each comprises a respective key and initialisation vector. The encryption codes 00 and 01 at level L2 are produced in dependence upon the parent node 0 of L1. Similarly, the encryption codes 10 and 11 of level L2 are generated in dependence upon the parent node 1 of L1. Thus it can be seen that the encryption codes have hierarchical dependencies.

Now consider how selective access might be provided only to frames 2 to 5 of hierarchical level L3 (just as for person C in FIG. 7D). Rather than storing all of the decryption codes on the disc, the binary tree technique allows a reduced number of decryption codes to be provided to the user yet provides sufficient decryption data to facilitate decryption of the authorised portion of data. In this example only frames 2 to 5 of frames 1 to 8 are to be decrypted. To decrypt frame 2 but not frame 1 code K1 of node 001 is required; to decrypt frames 3 and 4 code K2 of node 01 is required; and to decrypt frame 5 but not frame 6 code K3 of node 100 is required. Accordingly, keys and initialisation vectors corresponding to the three nodes 001, 100 and 01 are required to selectively decrypt frames 2 to 5. In general, the minimum set of codes required for decryption of only a particular portion (subset of frames/fields) of the video sequence are derived by determining the nodes at the lowest hierarchical level (L0 being the uppermost level) that are connected only to that portion of the video sequence to be decrypted. No other codes are required to effect the decryption. Thus it can be seen that a given set of content encryption keys will be associated with a respective portion of the information sequence to be decrypted.

Consider the hierarchy of content access permissions for different users as illustrated by FIG. 7 together with the binary tree encryption scheme illustrated by FIG. 8. As explained above, selective access to the content is effected by making the appropriate subset of content encryption keys accessible to the user. A given set of content encryption keys appropriate to the frames to which that user has access is stored in encrypted form on the recording medium in the data access package, the encryption being performed using that user's public key. There is a subset of encrypted content encryption keys stored for each user, each user having a respective public key with which their subset of content encryption keys has been encrypted. However, where the range of frames for which access is permitted overlap for a user or where a user has access to adjacent frame ranges the relationships between content encryption keys that derive from the binary key encryption scheme can be exploited to reduce the volume of data that must be stored in the data package. Consider a first example involving overlapping access permissions in which user A has access to frames 0 to 200; user B has access to frames 100 to 400; and user C is permitted access to frames 150 to 190 by A and given access to frames 180 to 300 by B. Consider also a second example involving adjacent frame ranges in which user C is given access to frames 190 to 200 by A and to frames 201 to 210 by B. In each of these first and second examples, rather than storing two distinct sets of content encryption keys (one corresponding to the frame range made accessible to C by A and the other corresponding to the frame range made accessible to C by B), each encrypted with user C's public key, a single set of encrypted content encryption keys formed by combining the two distinct sets of keys is stored. The combined sets of keys include only the principle nodes, considering the full set of accessible frames rather than the two individual sets. In some cases combining the two sets of keys is trivial but in other cases it is appropriate to replace two sibling nodes by their parent node. This process of replacing sibling nodes may have to be performed a number of times to derive the core set of principal nodes. The construction of the binary tree of FIG. 8 is such that the sibling keys are XOR'ed to derive the parent key. The merging of the two sets of keys reduces the size of the data package and also reduces the amount of computation required at the playback stage when recovering (by decryption) the content encryption keys using the private key of the user.

Figure 9:
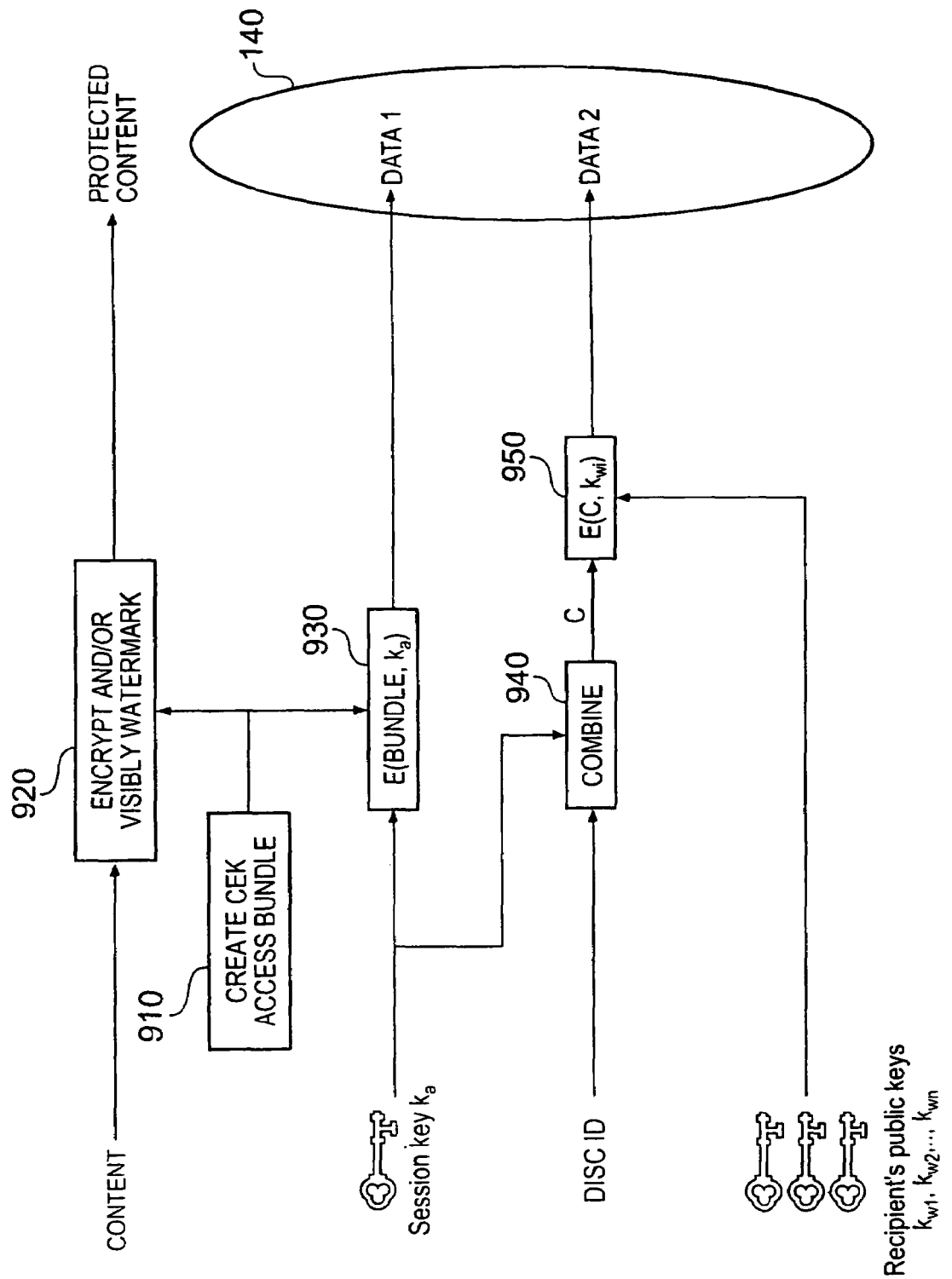
FIG. 9 schematically illustrates an encryption scheme in which a Disc ID is used in the encryption process.

FIG. 9 schematically illustrates a second encryption scheme according to the present technique. In this case a unique or quasi-unique, read-only, disc identifier (ID) read from the recording medium 140 is utilised in the encryption process. This provides an effective barrier against decryption of data derived from an unauthorised copy of the disc. As for the arrangement of FIG. 5, a set of content encryption keys is generated, for example according to the binary tree encryption scheme of FIG. 8. The set of content encryption keys, denoted the access bundle 910, is used to encrypt and/or visibly watermark the information content at stage 920 and the encrypted information content is stored on the disc 140. Note that the notation E(data to be encrypted, key) has been used to represent an encryption process in FIGS. 9 to 13 and 15 whereas the notation D(data to be decrypted, key) has been used to represent a decryption process. At stage 930 the access bundle is symmetrically encrypted using a randomly generated session key $k_a$ and the output of stage 930 is stored on the recording medium 140 as Data 1. The randomly generated session key $k_a$ is also supplied to a combiner 940 where it is combined with the disc ID by modulo 2 addition (i.e. an XOR logic gate) to generate a session key/disc ID combination C. Alternative embodiments may combine the session key and disc ID other than by modulo 2 addition. At stage 950 the combination C is asymmetrically encoded using the public keys $k_{w1}$, $k_{w2}$, $k_{w3}$ ... $k_{wn}$ of each of a plurality n of intended recipients. The public keys are obtained from the user directory 420 of the RMD 130. The plurality of versions of the asymmetrically encrypted combination C are stored on the recording medium 140 as Data 2 along with the symmetrically encrypted bundle of content encryption keys.

Figure 10:
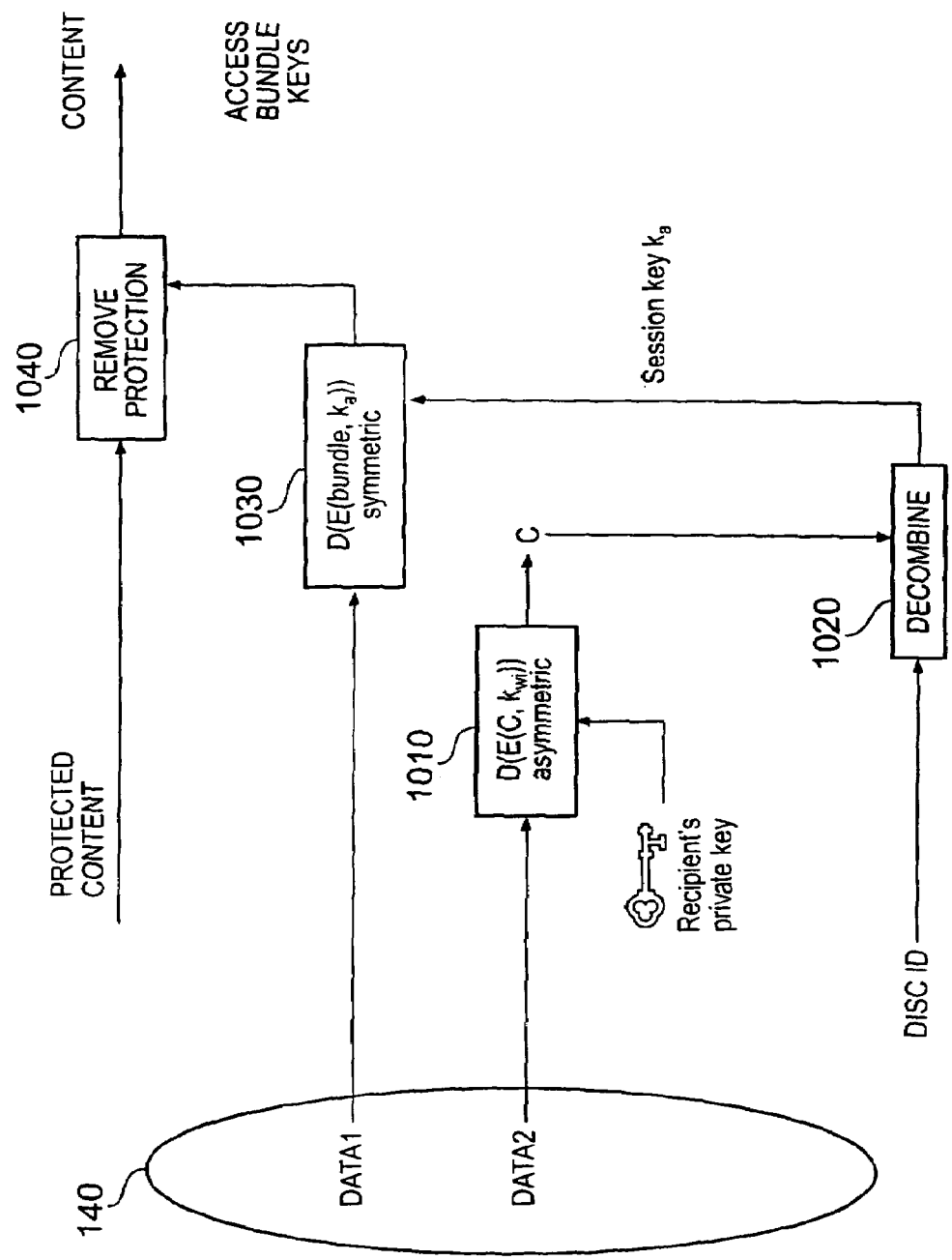
FIG. 10 schematically illustrates a decryption scheme corresponding to the encryption scheme of FIG. 9.

FIG. 10 schematically illustrates a decryption process for recovering information encrypted by the second encryption process of FIG. 9. The first stage 1010 of the decryption process involves reading Data 2 from the recording medium 140 and decrypting the asymmetrically encoded combination C using the private key of the recipient whose RMD is installed in the reproducing apparatus. This results in recovery of the combination C. Next, at stage 1020, the unique disc ID is read from the recording medium 140 and used to reverse the combination of the disc ID and session key to obtain the session key $k_a$. The session key is then used at stage 1030 to decrypt the access bundle that comprises the content encryption keys appropriate to the access permissions of the RMD owner. Finally, at stage 1040, the access bundle keys are used to decrypt the portion of information content for which the recipient has access permission.

Figure 11A:
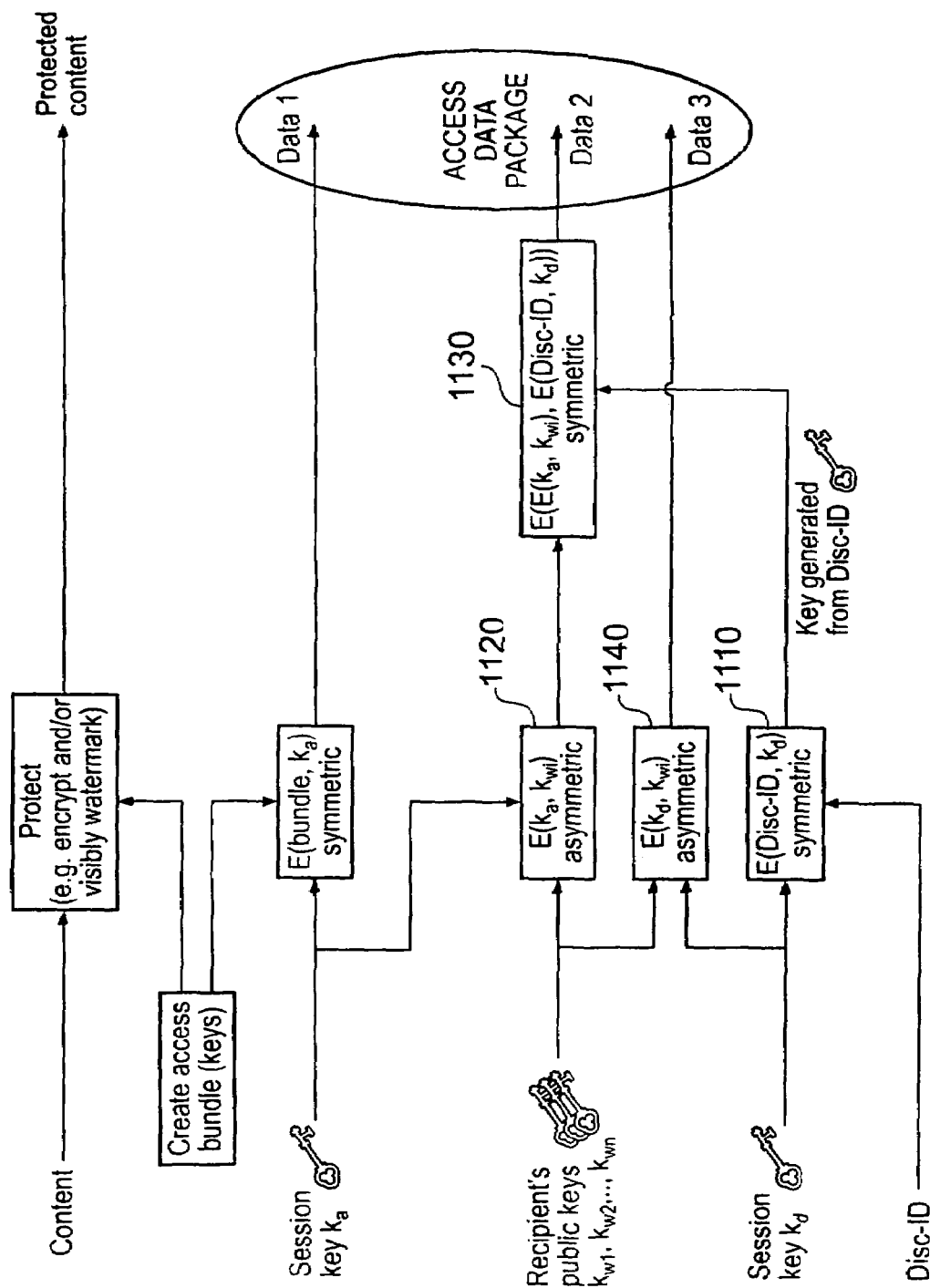
FIG. 11A schematically illustrates an alternative encryption scheme involving the disc ID.

FIG. 11A schematically illustrates an alternative encryption process involving the disc ID to that of FIG. 9. As for the process of FIG. 9, the information content is symmetrically encrypted using the access bundle of content encryption keys and the access bundle is symmetrically encrypted using a randomly generated session key $k_a$ and stored on the disc as Data 1. However in this scheme, rather than combining the session key $k_a$ with the disc ID, the disc ID is symmetrically encrypted at stage 1110 using a further session key $k_d$ to generate a disc ID based encryption key (symmetric) denoted the "effective disc ID". The session key $k_a$ is asymmetrically encrypted at stage 1120 using each of the public keys of the intended recipients and the result of this asymmetric encryption is then symmetrically encrypted at stage 1130 using the effective disc ID and stored on the recording medium as Data 2. The further session key $k_d$ is also asymmetrically encrypted at stage 1140 using the public keys of each of the intended recipients and the results of this encryption are stored on the recording medium as Data 3. Accordingly, in this case, the access data package stored on disc comprises: the symmetrically encrypted bundle of CEKs; the session key $k_a$ that has been asymmetrically encrypted using the recipients public keys and then symmetrically encrypted using the Effective disc ID; and the second session key $k_d$ that has been asymmetrically encrypted using the recipient's public keys.

Figure 11B:
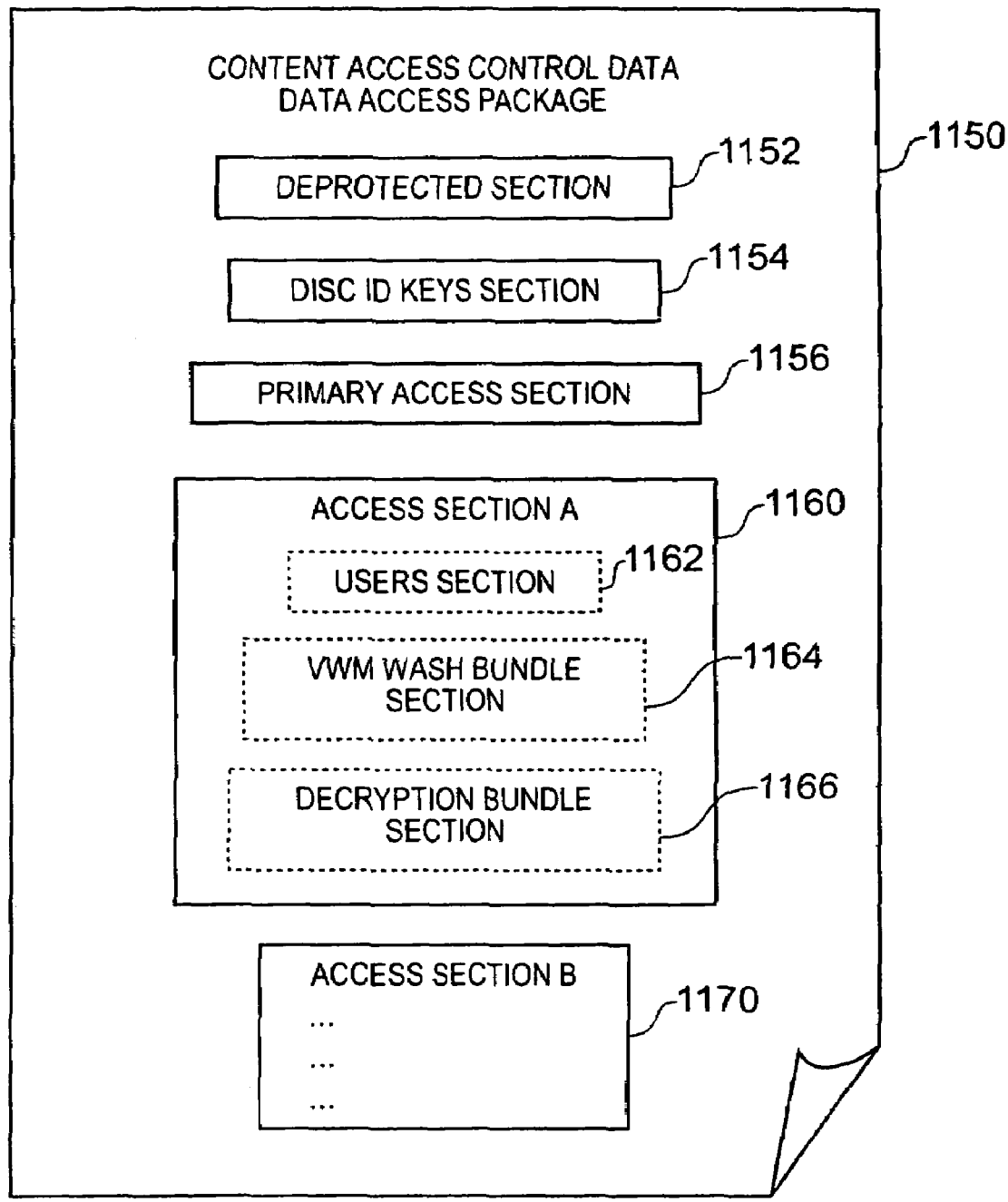
FIG. 11B schematically illustrates content access control data that is stored on the recording medium.

FIG. 11B schematically illustrates a data access package 1150, which is included in a set of content access control data that is stored on the recording medium. More than one data access package may be recorded on the recording medium. Each data access package 1150 relates to a single piece of data content (for example a sequence of video images recorded by a given camera operator) and lists all of the information required by every authorised user or user group who has been granted some level of access to that piece of data content. Each authorised user or user group can access a portion of the encrypted information content that is recorded on the recording medium together with the content access control data determined by the access level available through their respective private keys. The data access package also lists the number of levels of the binary tree (see FIG. 8) for the corresponding piece of data content (i.e. the minimum number of levels is used to cover the entire frame range of the particular piece of content). The data access package comprises: a deprotected section 1152, a medium identifier keys section 1154; a primary access section 1156; a first access section 1160 and a second access section 1170. The data access package may comprise a plurality of access sections. Each access section 1160, 1170 comprises a users section 1162, a visible watermarking (VWM) wash bundle section 1164 and a decryption bundle section.

The deprotected section 1152 lists the image frame ranges that have been decrypted and/or washed of visible watermarks. This ensures that a decryption process is not performed twice on the same frame since decryption of an already decrypted frame would distort the image. The medium ID keys section 1154 lists all users that have some access granted by the data access package. For each user, the encrypted medium identifier session key $k_d$ is listed. The value of $k_d$ is specific to the particular data access package (whereas a different content access session key $k_a$ is used for each access section 1160, 1170). Each user can decrypt $k_d$ using their own private key. The access sections 1160, 1170 each provide information that permits access to a certain section of the piece of information content. Increased access permissions may be provided to other portions of the content by adding further access sections to the data access package. The first access section 1160 is a "primary access section", which provides access to the entire piece of information content to a particular group of users. This access package is recorded at the time the content is recorded on the recording medium (which is typically when the content is created). The primary access access section will typically be the only access section in the package at the time of content recording/ creation. Each user who is listed in the primary access section is denoted a "default user". Default users are given the same level of access to the piece of information content with which the data package 1150 is associated as the person who records (and possibly creates) the encrypted data content i.e. access to the entire contents of the data package. Further access sections may be added to the recording medium later to give other authorised users listed therein access to all or part of the content.

A flag in each access section header indicated whether or not the corresponding access section is tied to the medium identifier as in the embodiment of FIG. 11. Rather than being tied to the medium identifier, the content session key $k_a$ may simply be asymmetrically encrypted using the public keys of the users listed in that access section, the asymmetrically encrypted version(s) content session key $k_a$ being stored on the recording medium. Accordingly, the medium identifier session key $k_d$ is not required for decryption. This encryption scheme is used for the "master user" as described with reference to FIG. 13 below. However, for the master user, access to all of the content is provided. This need not be the case for the group of users associated with an access section that is not tied to the medium identifier.

Each access section comprises the user section 1162, the VWM wash bundle section 1164 and the decryption bundle section 1166. The user section 1162 lists each user or user group that has access to the piece of content associated with the access section. For each user the encrypted content access session key $k_a$ is listed. The user can decrypt $k_a$ using either their private key alone (if the access section is not tied to the medium identifier) or using both their private key and the medium identifier session key $k_d$ (if the access section is tied to the medium identifier). A different content access session key $k_a$ is used for each access section. The VWM wash bundle section 1164 has one or more sub-sections. Each sub-section relates to a frame range specified in the sub-section header and stores the encrypted versions of the keys (from the binary tree encryption scheme) required to wash the visible watermark from those frames. The VWM keys are all encrypted using the content access session key $k_a$ so that they can be decrypted only by users listed in the users section 1162 of the access bundle 1160. The decryption bundle section 1166 also has one or more sub-sections, each sub-section covering a frame range listed in the sub-section header and lists the keys (from the binary tree encryption scheme) required to decrypt those frames. In this case the encryption scheme is symmetric or asymmetric encryption rather than visible watermarking. Again, keys are all encrypted using the content access session key $k_a$ so that they can be decrypted only by users listed in the users section 1162 of the access bundle 1160.

Figure 12:
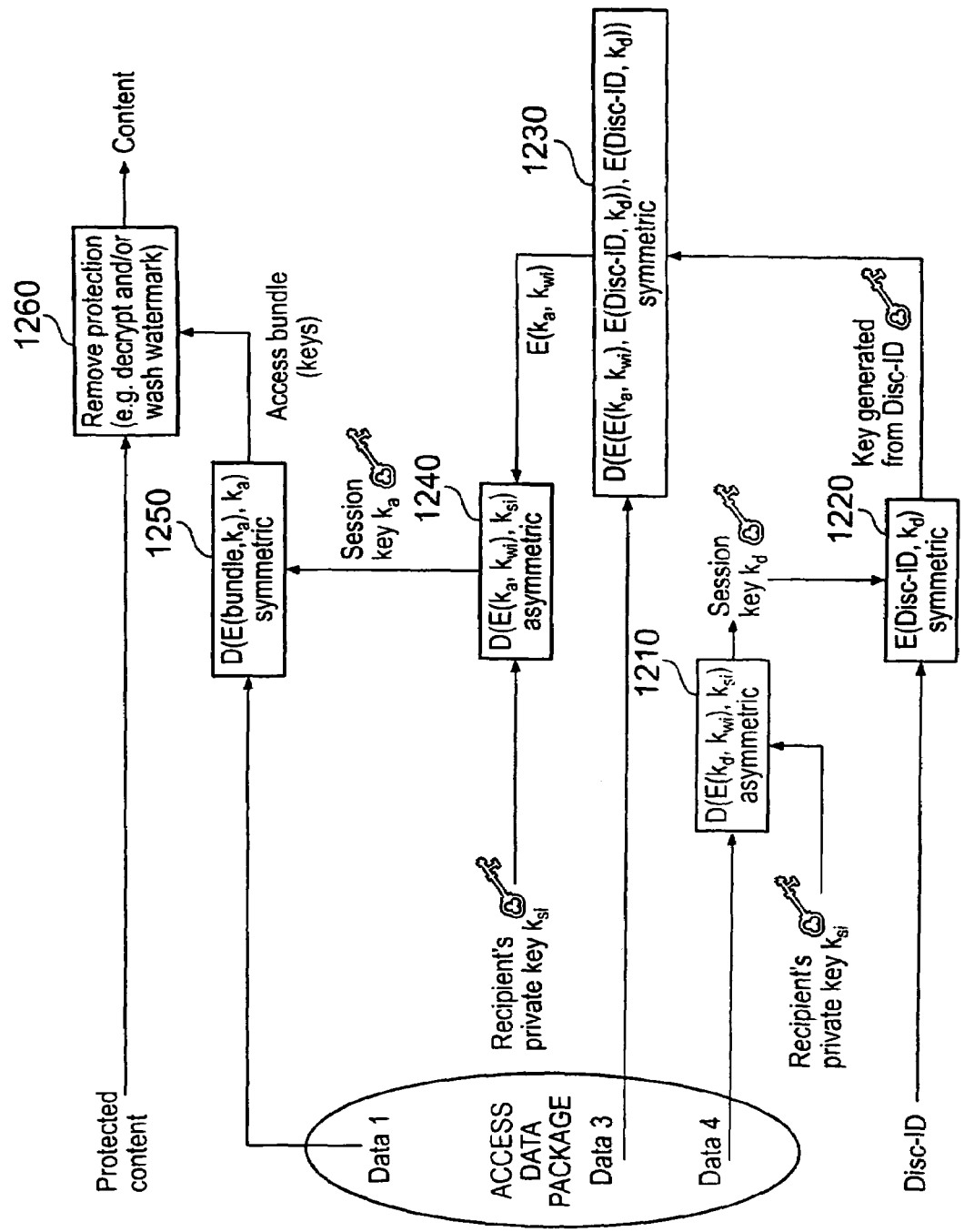
FIG. 12 schematically illustrates a decryption scheme corresponding to the encryption scheme of FIG. 11A.

FIG. 12 schematically illustrates the decryption process that is carried out to recover the data encrypted according to the scheme of FIG. 11A. First, at stage 1210 the recipient's private key $k_{si}$ is used to decrypt the further session key $k_d$ from the asymmetrically encrypted version stored on disc (as Data 3). Next, at stage 1220, the Effective disc ID is regenerated from the Disc ID using the further session key $k_d$ recovered at stage 1210. The Effective disc ID, which is a symmetric key, is used to perform a first stage of decryption on the quantity Data 2 from the recording medium to recover the asymmetrically encrypted first session key $E(k_a, k_{wi})$ A subsequent stage 1240 of decryption is then performed using the recipient's private key $k_{si}$ to reverse the asymmetric encryption thereby recovering the session key $k_a$. The session key $k_a$ is then used at stage 1250 to decrypt the access bundle CEKs. Finally at stage 1260, the access bundle CEKs are used to decrypt the symmetrically encrypted and/or visibly watermarked information content stored on the recording medium.

Figure 13:
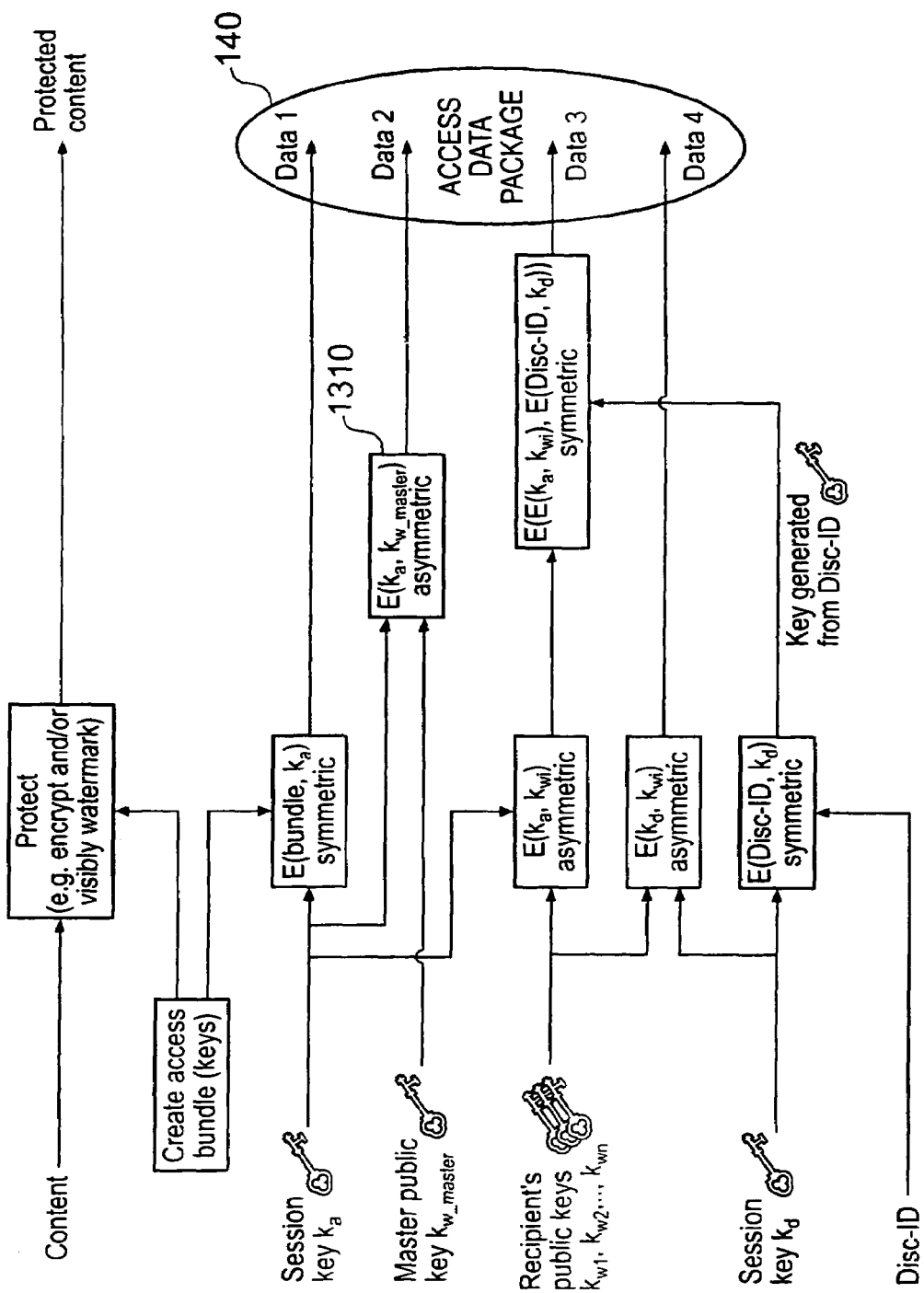
FIG. 13 schematically illustrates an encryption scheme that includes encryption of data for a master user.

FIG. 13 schematically illustrates an encryption scheme according to which access permissions to all of the information content are granted to a "master user". The master user is defined to be a user or user group having access to the entire content to which a data access package 1150 (see FIG. 11B) relates regardless of the medium identifier. Accordingly, the medium identifier session key $k_d$ is not required for decryption of the content. Although default users listed in the primary access section 1160 of the data access package 1150 also have access to the entire content, default users may or may not be tied to the medium identifier. Any number of users or user groups may be added to the group of master users of default users in the data access package 1150. This encryption scheme closely corresponds to that of FIG. 11A, the only difference being the addition of the further stage 1310 where the session key $k_a$ is asymmetrically encrypted using a master public key $k_{w\_master}$ and then stored on the recording medium 140. The master public key $k_{w\_master}$ is stored on the RMD of every user and the master user is granted access permissions to the entirety of the information content stored on the recording medium. A different master public key may be provided for each of a respective plurality of master users. The corresponding private key of the master user is securely stored on a master RMD. The master RMD may be used to ensure that access to encrypted data is not lost due to inadvertent loss of non-master RMDs. As shown at stage 1410 of FIG. 14, the master user is able to recover the session key $k_a$ by a single decryption step involving the master private key $k_{s\_master}$ without the need for access to the Disc ID. To enable master user(s) to access the entire content associated with the data access package regardless of the disc ID, each master user must be provided with access to encrypted keys in both the VWM wash bundle section 1164 and the decryption bundle section 1166 (see FIG. 11B) of the primary access section. Each master user is provided with such access by directly encrypting the content access key $k_a$ of the primary access section using the master user's public key and storing this encrypted $k_a$ somewhere in the data access package.

In the example of FIG. 13, the encryption of the session key $k_a$ is not tied to the Disc ID for the master user. However, in an alternative arrangement the master user may be tied to the Disc ID. Similarly, one subset of recipients may be tied to the Disc ID whereas another set of recipients may be given more liberal access permissions by directly encrypting the session key $k_a$ with their public key as is the case for the master user in FIG. 13.

Figure 15:
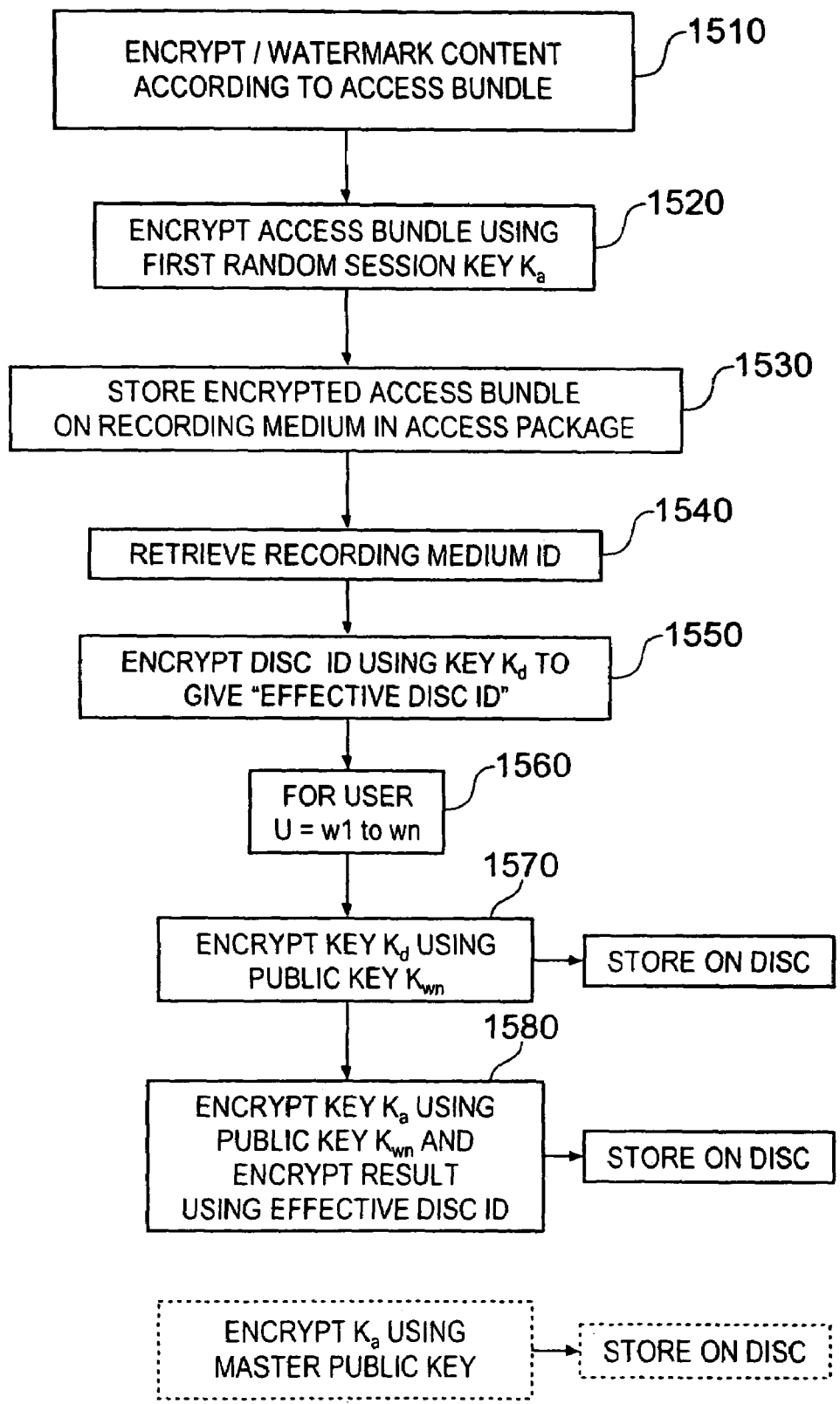
FIG. 15 is a flow chart that schematically illustrates the sequence of operations performed in the encryption schemes of FIGS. 11 and 13.

FIG. 15 is a flow chart that schematically illustrates the encryption sequence corresponding to FIGS. 11 and 13. At stage 1510 the access bundle of CEKs is used to encrypt and/or watermark the information content and the encrypted content is stored on the recording medium. The subsequent stages of the process involve creation of an access data package for recording on the disc alongside the encrypted information content. At stage 1520, the CEKs of the access bundle are symmetrically encrypted using a first randomly generated session key $k_a$ and subsequently, at stage 1530, the encrypted access bundle is stored on the recording medium as part of the access data package. At stage 1540, the Disc ID is obtained and then at stage 1550 the second session key $k_d$ is generated and used to symmetrically encrypt the disc ID. The result of this encryption is subsequently used as an encryption key that will be referred to as the "effective disc ID". The encryption process then proceeds to stage 1560 where an encryption sequence is performed for each of n recipients (i.e. intended authorised users) w1, w2, . . . , wn. In particular, at stage 1570 the second session key $k_d$ is encrypted using the public key of the recipient and the result is stored on the recording medium. At stage 1580 a two stage encryption process is performed for each recipient: firstly, the first session key $k_a$ is asymmetrically encrypted using the recipient's public key; secondly, the output of the asymmetric encryption is symmetrically encrypted using the effective disc ID and stored on the recording medium. In the case of the encryption scheme of FIG. 13 the flow chart involves the additional stage 1590 of encrypting the first session key $k_a$ using the public key of the master user and storing the result on disc.

Figure 14:
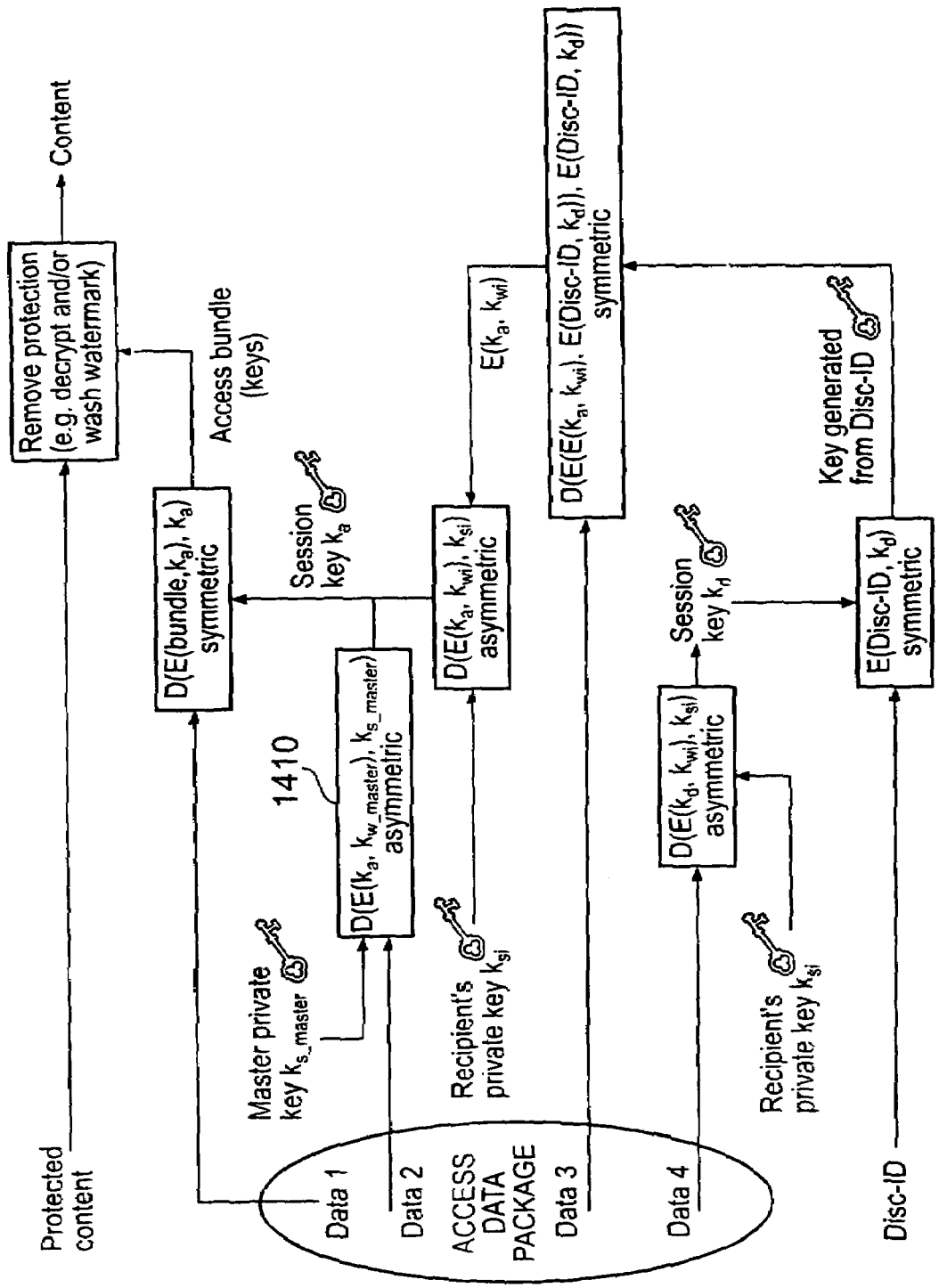
FIG. 14 schematically illustrates a decryption scheme corresponding to the encryption scheme of FIG. 13.
Figure 16:
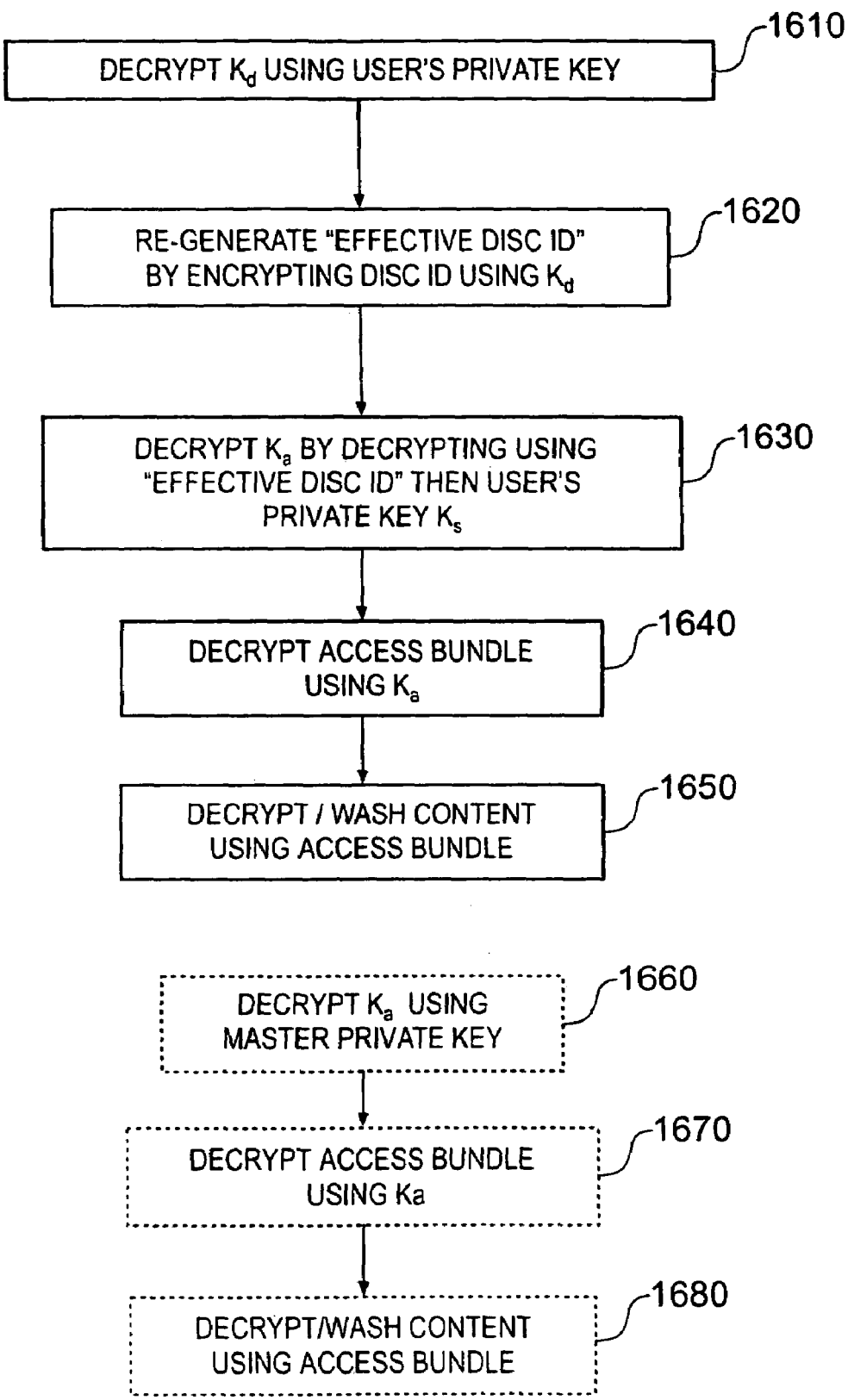
FIG. 16 is a flow chart that schematically illustrates the sequence of operations performed in the decryption schemes of FIGS. 12 and 14.

FIG. 16 is a flow chart that schematically illustrates the decryption sequence corresponding to FIGS. 12 and 14. The decryption is considered in terms of an individual recipient decrypting the portion of information content that he is authorised to access, using the private key stored on his RMD 130. The decryption process starts at stage 1610 where the second session key $k_d$ is decrypted using the user's private key $k_s$. Subsequently, at stage 1620, the effective disc ID is generated by encrypting the disc ID (which is assumed to be available to the recipient) using the second session key $k_d$. Next, at stage 1630, the first session key $k_a$ is decrypted using both the effective disc ID and the user's private key. At stage 1640 the access bundle of CEKs is decrypted using $k_a$. This enables decryption and/or visible watermark washing to be performed at stage 1650. In the case of the decryption arrangement of FIG. 14 the flow chart comprises the further stages of decrypting $k_a$ using the master user's private key 1660, decrypting the access bundle using the first session key $k_a$ 1670 and decrypting and/or washing of the information content using the decrypted access bundle 1680.

Figure 17:
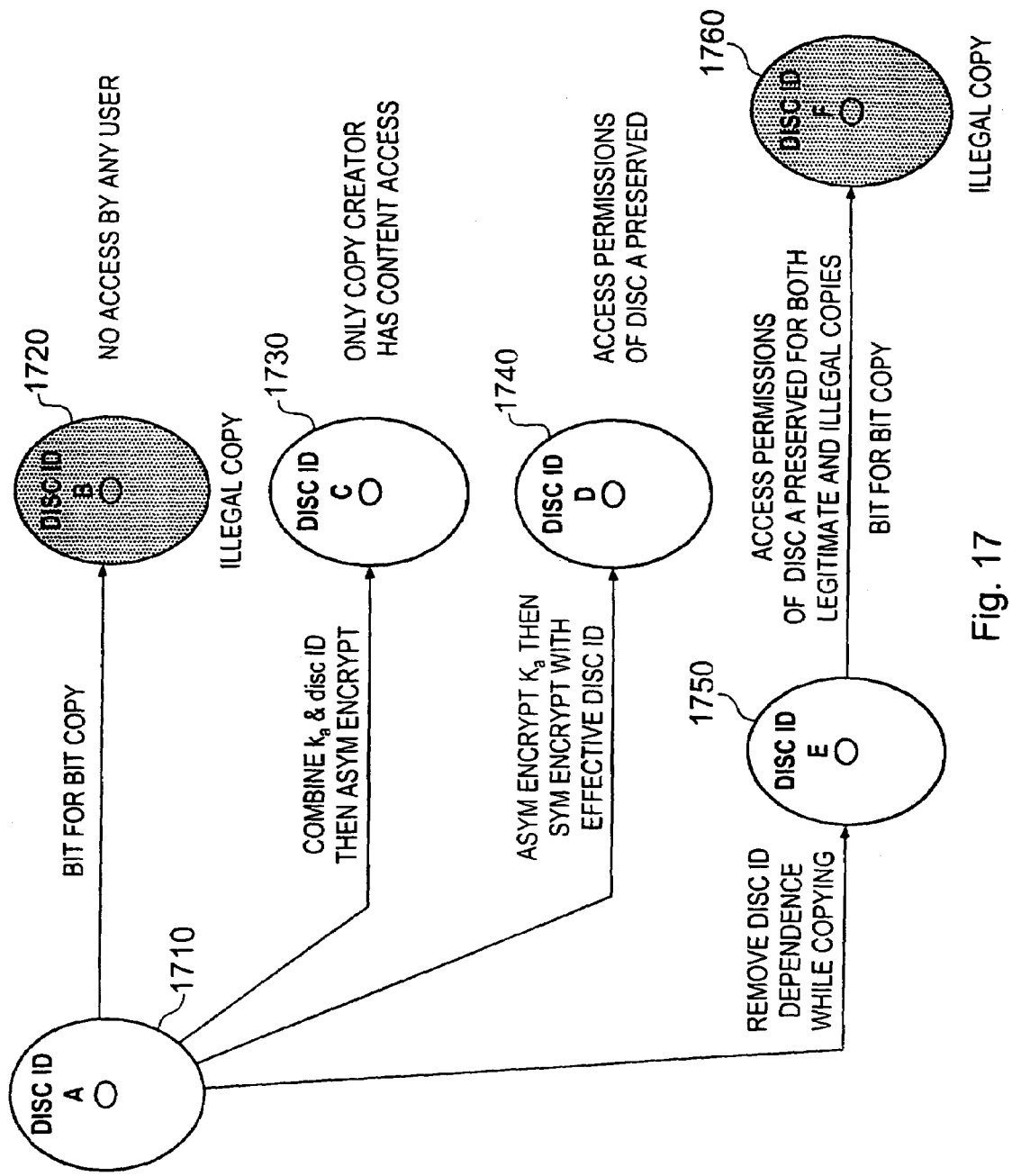
FIG. 17 schematically illustrates the access permissions that are carried over when a disc is copied.

FIG. 17 schematically illustrates the access permissions that are carried over when a disc is copied. The access permissions carried over to the copy depend upon the particular encryption scheme used. Consider an original disc 1710 having disc ID A. If a direct binary copy (bit for bit) of the original disc is made then provided that the encryption process is tied to the disc ID no users will be able to access the content of the illegal copy 1720 having disc-ID B. In this case the master user may be able to access the content provided that he was not tied to the disc ID during the encryption process (i.e. if the first session key $k_a$ was encrypted using only the master user public key).

The disc 1730, having disc ID C, represents a legitimate copy of disc A in the case where the access data package stored on disc A tied the encryption to the disc ID by combining the first session key $k_a$ with the disc ID and then asymmetrically encrypting the result using the recipients public keys. This corresponds to the encryption process of FIG. 9. In this case the legitimate copy made by a user on a disc 1730 having disc ID C contains information content that is accessible only to the authorised user who created the copy but not to any of the other authorised users who had access to the information content stored on the original disc 1710. The copy creator will have access only to that portion of the information content specified by the original access data package. Again, in this case, the master user will only have access to information content on the legitimate copy 1730 if he was not tied to the disc ID during the encryption process.

The disc 1740, having disc ID D, represents a legitimate copy of disc A in the case where the access data package stored on disc A tied the encryption to the disc ID by asymmetrically encrypting the first session key $k_a$ and then symmetrically encrypting the first session key with the effective disc ID. This corresponds to the encryption process of FIGS. 11 and 13. This encryption scheme has the advantage over that of FIG. 9 that when a legitimate copy is made by an authorised user the original set of user access permissions is preserved. Accordingly, all users who had access to information content on the original disc A have the same level of access to information stored on the legitimate copy, disc D. The master user is also guaranteed to have access to the information content via the legitimate copy 1740 regardless of whether or not he was tied to the disc ID.

Finally, consider making a legitimate copy of the original disc 1710 but removing the dependency on the disc ID as the data is copied before storing it on disc E. In this case the access permissions of the original disc 1710 will be retained both for the legitimate copy 1750 and for an illegal binary copy 1760 of that legitimate copy. The master user will also have access to both the legitimate and illegal copies 1750 and 1760.

Clearly the encryption scheme of FIGS. 11 and 13 has the distinct advantage that it allows the access permissions to be preserved when legitimate copies of an original disc are made yet denies access to information content stored on an illegal binary copy of the original disc.

Figure 18:
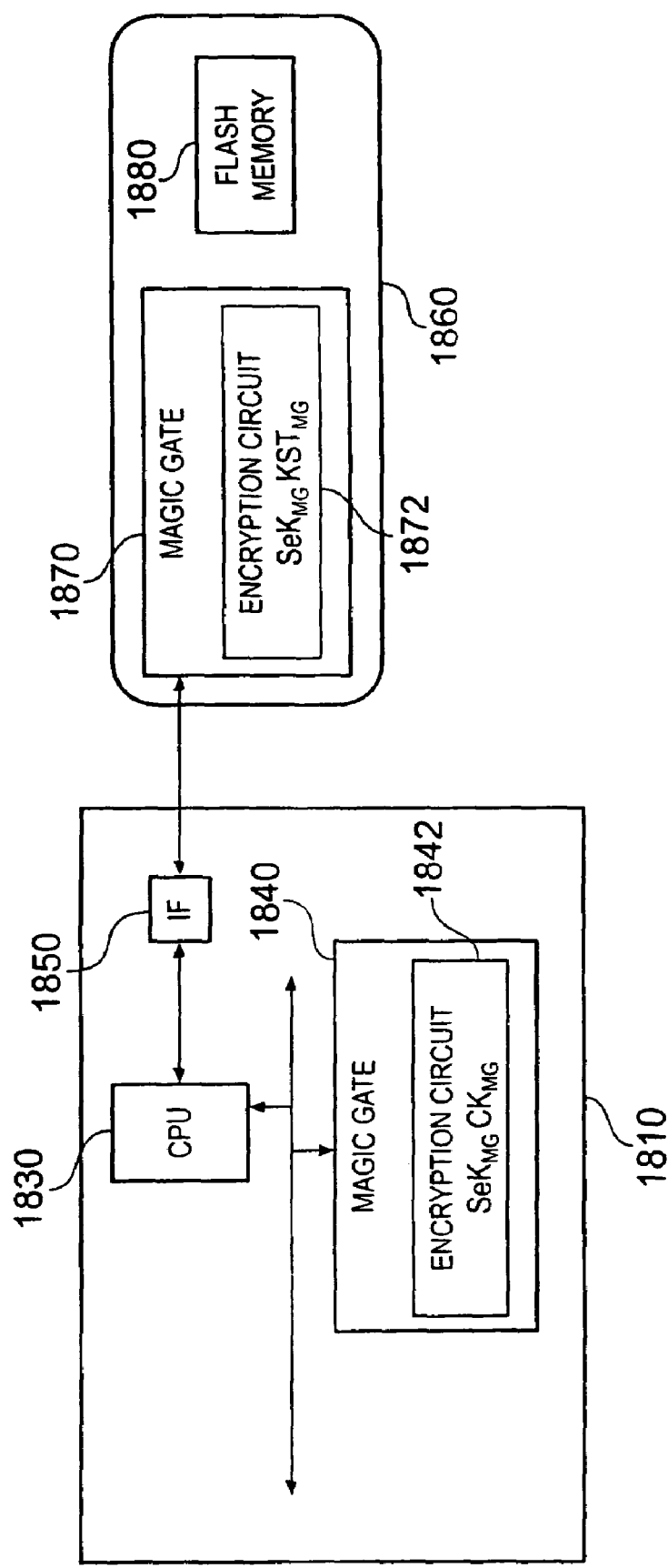
FIG. 18 schematically illustrates a Magic Gate™ device and memory stick.

FIG. 18 schematically illustrates a Magic Gate memory stick and Magic Gate memory stick device. The Magic Gate Memory stick is one example of an RMD that may be used for secure storage of the user directory and private keys according to the present technique. The Magic Gate system comprises a Magic Gate device 1810 and a Magic Gate memory stick 1860. The Magic Gate device has: a central processing unit (CPU) 1830 for performing data processing operations; a Magic Gate Module 1840 having an encryption circuit 1842; and an interface (IF) 1850 via which the memory stick 1860 establishes a connection with the Magic Gate device 1850. The memory stick 1870 has a flash memory module for storing data and a Magic Gate (MG) module having an off-board encryption circuit 1872. The encryption circuit of the device 1842 has two associated encryption keys i.e. an MG session key $SeK_{MG}$ and an MG content key $CK_{MG}$. The off-board encryption circuit of the memory stick, on the other hand, utilises the MG session key $SeK_{MG}$ and an MG storage key $KST_{MG}$. The MG content key $CK_{MG}$ is used by the device 1810 for encryption/decryption of information content. The MG session key $SeK_{MG}$ is used by both the device 1810 and the memory stick 1860. It is generated on each authentication and is used for temporary data exchanges. The MG storage key $KST_{MG}$ is used by the memory stick for encryption/decryption of the MG content key $CK_{MG}$.

The Magic Gate system provides mutual confirmation between the memory stick 1860 and the device 1810 that both the memory stick and the device support copy protection and content encryption/decryption may be performed by the device 1810 with authorised memory sticks 1860. The Magic Gate system uses encryption/decryption (and associated keys) not only for the information content but also for the authentication process. Authentication must be performed as a first step each time a memory stick 1860 establishes a connection via the interface of the device 1810 and thereafter recording and playback of content becomes possible.

Figure 19:
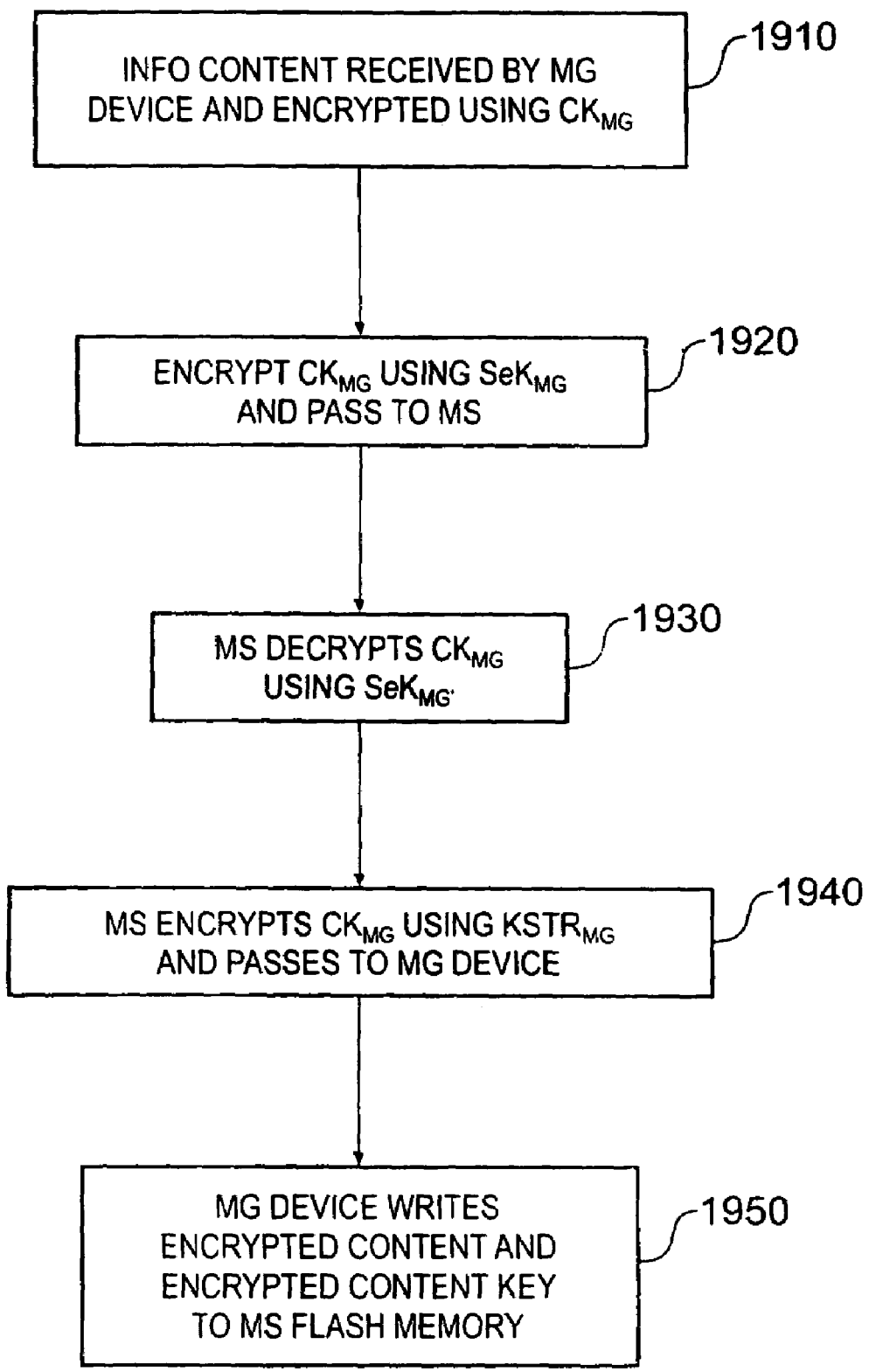
FIG. 19 is a flow chart that schematically illustrates a recording process in the Magic Gate™ system.

FIG. 19 is a flow chart that schematically illustrates a recording process in the Magic Gate system. The recording process starts at stage 1910 where information content received by the MG device is encrypted in the encryption circuit 1842 using the MG content key $CK_{MG}$. Next, at stage 1920 the MG content key $CK_{MG}$ is encrypted using the MG session key $SeK_{MG}$ and sent across the interface 1850 to the memory stick 1860. The encryption using the session key $SeK_{MG}$ provides a secure link between the memory stick 1860 and the device 1810. At stage 1930, the memory stick 1860 decrypts the MG content key $CK_{MG}$ using the established MG session key $SeK_{MG}$ and then at stage 1940 the MS proceeds to encrypt $CK_{MG}$ using the MG storage key $KST_{MG}$ before passing the encrypted content key to the device 1810. Finally at stage 1950 the device 1810 writes the encrypted content and the encrypted content key to the flash memory 1880 of the memory stick 1860.

Figure 20:
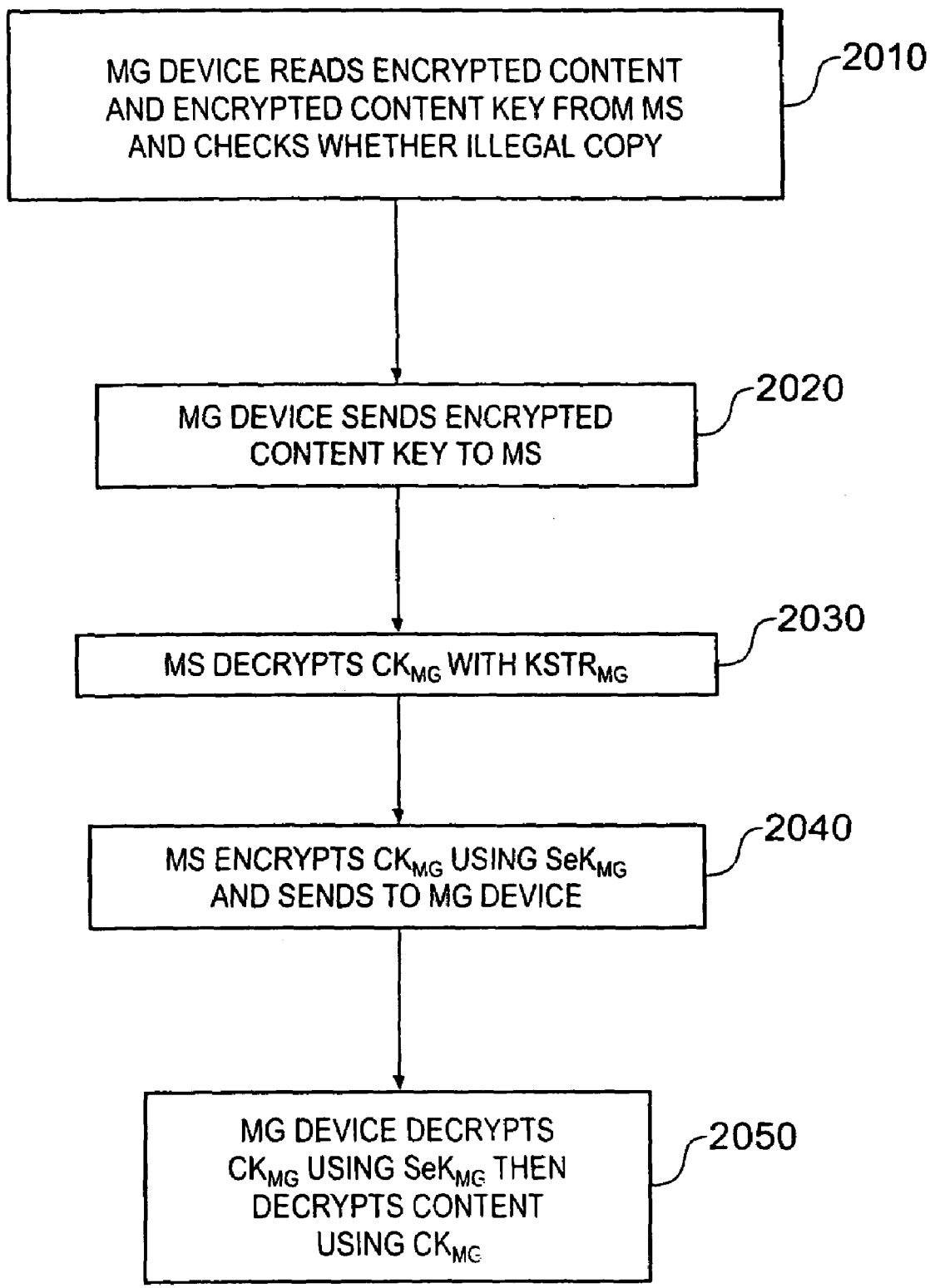
FIG. 20 is a flow chart that schematically illustrates a playback process in the Magic Gate™ system.

FIG. 20 is a flow chart that schematically illustrates a playback process in the Magic Gate system. The playback process begins at stage 2010 where the MG device 1810 reads the encrypted information content and encrypted content key from the memory stick 1860 and performs a check to ensure that the data does not correspond to an illegal copy. Next, at stage 2020, the MG device 1860 sends the encrypted content key to the memory stick 1860. The playback process then proceeds to stage 2030 where the memory stick decrypts the content key $CK_{MG}$ using the MG storage key $KST_{MG}$. At stage 2040, the memory stick 1860 encrypts the content key $CK_{MG}$ using the MG session key $SeK_{MG}$ and sends the result to the MG device s 1810. Finally, at stage 2050 the MG device 1810 decrypts the MG content key $CK_{MG}$ using the MG session key $SeK_{MG}$ and then decrypts the content.

Figure 21:
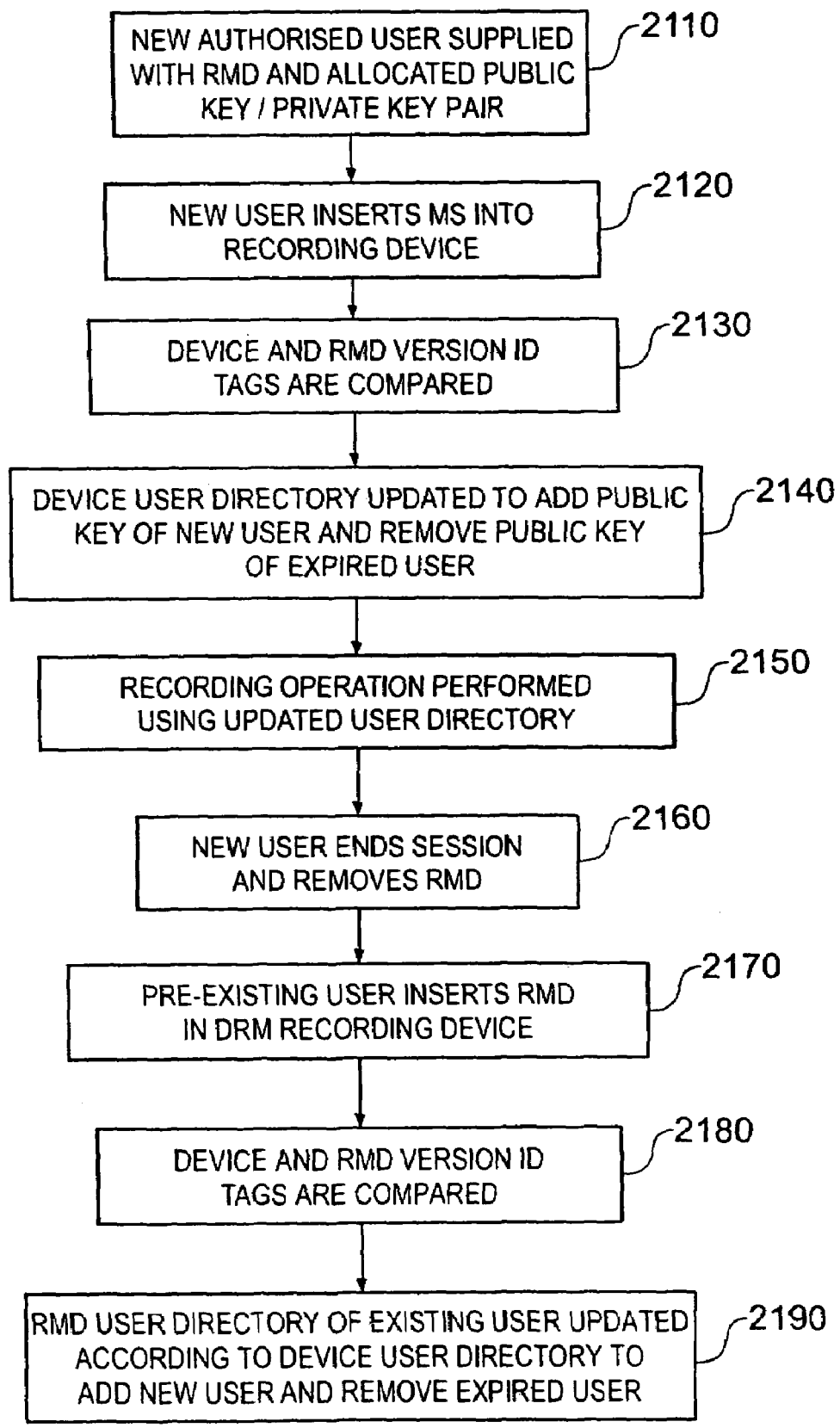
FIG. 21 is a flow chart that schematically illustrates how users are added to and removed from the system by updating of the user directory.

FIG. 21 is a flow chart that schematically illustrates how new authorised users are added to the system and users whose authorisation has expired are removed from the system according to the present technique. The first stage of the process 2110 is an administrative stage whereby a new authorised user is supplied with a personalised RMD on which a public key/private key pair specific to that authorised user are stored. The newly allocated RMD will also have a newly updated version of the user directory stored on it. The updated user directory includes the public key of the newly authorised user. Also, in this example, a user whose authorisation has expired has been removed from the most recently updated user directory. Next, at stage 2120, the new user inserts his newly allocated RMD into a compatible recording device where the RMD and device authenticate each other. Next, at stage 2130 a copy of the user directory stored locally in memory on the recording device is compared with the external version of the user directory stored on the RMD. Each of the user directories has a version-identification tag from which it can be determined whether either the local version or the external version of the user directory has been more recently updated. In this example a simple timestamp tag is used. It is established at this stage that the RMD user directory has been more recently updated than the local user directory since the new authorised user has been added to the system and the expired user has been removed. Accordingly, at stage 2140, the local user directory on the recording device is updated so as to add the public key of the newly authorised user and to remove the public key associated with the expired user. It is also necessary, at the stage of updating the user directory, to perform validation of the set 430 of default users to ensure that they are still listed as valid default users in the new user directory. Next at stage 2150 a recording operation is performed on the recording device e.g. where the recording device is a camera, new footage is captured by the newly authorised user whose RMD is installed in the camera. Either the external version or the local version of the user directory may be used to obtain the public keys of the recipients for use in encrypting the content keys. The two versions of the user directory should now be identical since the updating process has been completed. The access data package stored on the recording medium during the recording operation at stage 2150 has made use of the public key of the newly authorised user in the encryption process so that the newly authorised user will have access permission to at least a portion of the recorded information content. Typically, the cameraman will have permission to the newly captured information content in its entirety. Since new material has been captured a new access data package detailing the content access permissions is recorded on the recording medium. If an existing user gives the new user permission to existing content then the new user can be added to the access data package associated with that existing information content. This is achieved by encrypting the subset of the CEKs associated with the existing content to which the new user is to be given access using the public key of the new user and adding those encrypted CEKs to the existing access data package. At stage 2160 the new authorised user ends the recording session and removes his RMD from the recording device.

Subsequently, at stage 2170, an existing user inserts his RMD in the recording device to commence a new recording operation. At stage 2180 the local and external versions of the user directory are compared to determine whether one version has been more recently updated. This time it is established that the local version, which was updated at stage 2140 to add the new authorised user and remove the expired user, is more recent than the user directory stored externally on the RMD of the existing user. Again, validation of the set 430 of default users is performed. Finally, at stage 2190, the RMD user directory of the existing user is updated according to the local device user directory so as to add the newly authorised user and excise the expired user. Thus it can be seen that the changes to the user directory will propagate via version-comparison of user directories of RMDs and compatible devices each time a connection is established. Although the comparison is performed initially, on insertion of the RMD into the device in the above example, it will be appreciated that the comparison could alternatively be performed at some other stage during the communication sequence between RMD and device.

It will be appreciated that the propagation of an updated user directory may take some time. However, if a new user has not been added to the user directory at the time of content creation it is still possible to grant that new user full access to that recorded data content at the post-recording stage. Similarly, it will take a finite time to revoke the access of an expired user via updating of the user directories but the expired user could be required to return his RMD when his authorisation is removed (e.g. on leaving the company).

To prevent corruption of a user directory during the updating process it is important to be able to verify the authenticity of a given version of a user directory. A Digital signature can be used for this purpose. In one example arrangement the digital signature might be based on the entire contents of the user directory, including the version-identification tag. This means that the user directory can be stored in plain text since any unauthorised tampering with the user directory, for example, so as to change the date tag used for version identification, would mean that the digital signature of that user directory would not verify.

Figure 22:
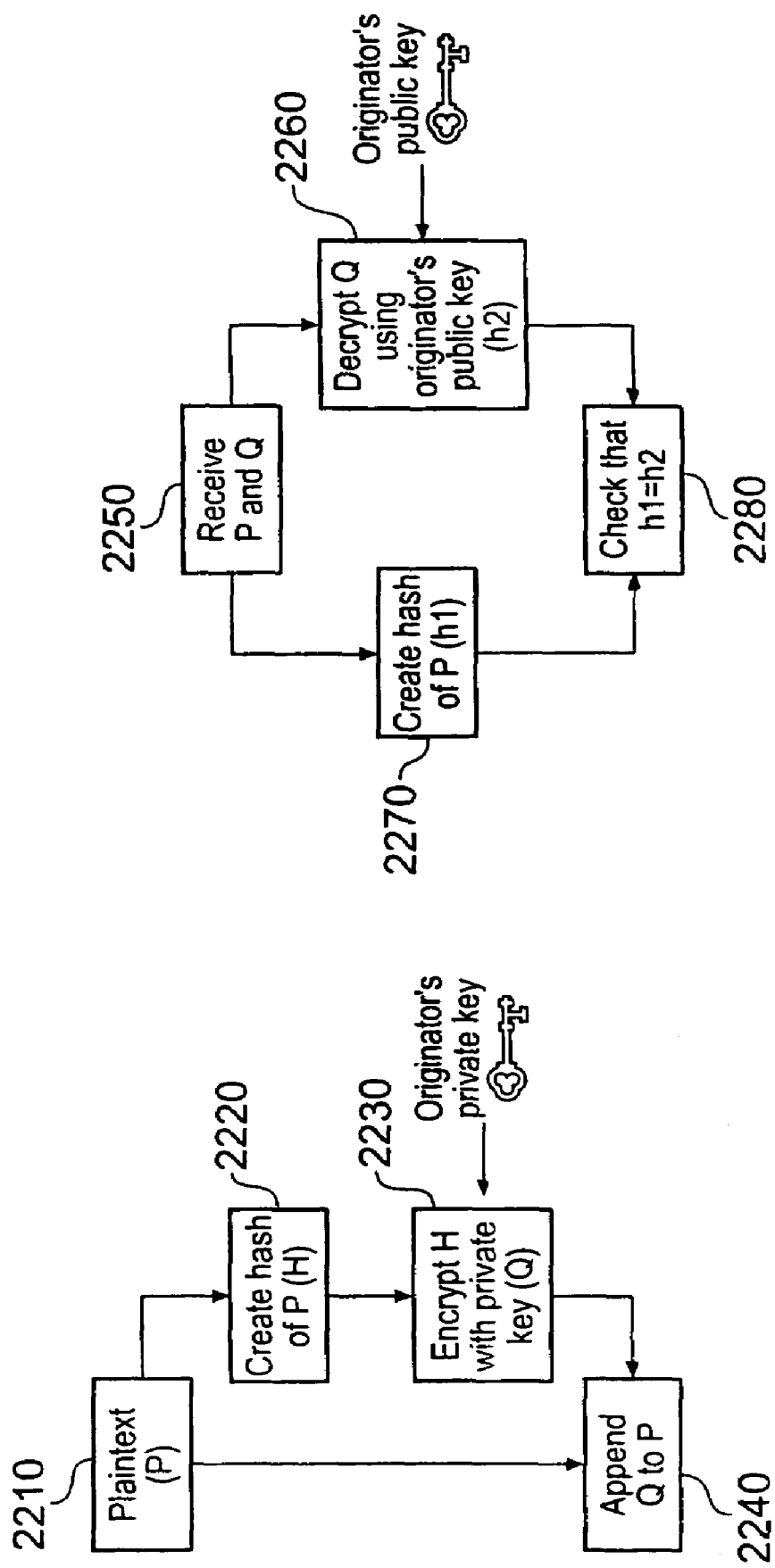
FIG. 22 schematically illustrates the message signing and verification procedures associated with a digital signature.

FIG. 22 schematically illustrates the message signing and verification procedures associated with a digital signature. The signing of the user directory with a digital signature starts with a plaintext version P of the user directory at stage 2210. At stage 2220 a hash of the plaintext P is created. A hash is a short fixed-length bit-string that is derived in a deterministic way from the plaintext data. Next at stage 2230, the originator of the digital signature uses his private key to encrypt the hashed plaintext to generate Q. Finally at stage 2240 the digital signature is completed by appending the encrypted hashed plaintext Q to the plaintext itself. The signature verification process starts at stage 2250, where the plaintext and signature Q are received, for example by a recording device. At stage 2260 the signature Q is decrypted by the recipient using the originator's public key to generate a quantity h2. It is necessary to ensure not only that the user directory being read is intact and correct but also that the source of the user directory is authorised to update it. In particular, it is necessary to ensure that the digital signature attached to the user directory originates from a trusted party. Accordingly, a user-directory verifying public key (corresponding to the originator's public key in FIG. 22) is stored within each device. The user directory must be signed using the corresponding private key in order to pass the verification test. At stage 2270 a hash of the plaintext is created resulting in output h1. Finally at stage 2280 the digital signature is verified by checking that h1=h2. If the digital signature of the user directory that is determined to be more recent than the version with which it is compared is not verified then the updating stage 2140 of the flow chart of FIG. 21 will not be performed. According to the present technique authorised users are provided with selective access to information content on the storage medium, for example, a user may be given access only to a certain subset of frames of a video sequence. The selective access is achieved by allowing the authorised user to decrypt only a subset of the content encrypting keys hence providing them with the ability to decrypt only those image frames for which the decrypted content keys are available. The binary tree encryption scheme that facilitates this was described above with reference to FIG. 8. In known encryption schemes the information content is likely to be encrypted or decrypted as a whole so processing of the decrypted data stream is straightforward. However, according to the selective access scheme of the present technique, the reproduced data stream is likely to comprise both video frames that remain encrypted and decrypted or partially decrypted (e.g. visibly watermarked) frames. It is desirable that the reproduction device should be able to distinguish between consecutive video frames whether they remain encrypted (being inaccessible to the given user) or have been decrypted using available keys of the access bundle. Furthermore, if frame boundaries are recognisable in the encrypted data stream it should then be possible to isolate distinct subsets of the encrypted data for separate distribution. The encrypted content is likely to conform to a particular data format. The portion of data that serves to identify the frame boundaries shall be denoted the "format identifying portion" of the data and the remaining data shall be denoted the "payload data portion". Consider, for example video stream data in MPEG2 format, such as video elementary stream data as found in optical disc (e.g. DVD) encoding techniques. In MPEG2 the video stream is organised as a hierarchy of headers and data that provide the information necessary to decode and display the picture elements (pels). The video data comprises frames having different predetermined frame types (I, P and B frames), which are arranged in groups of pictures (GOPs). Each header comprises a 4-byte code comprising a 3-byte start code prefix followed by a 1-byte start code ID. The start code prefix comprises a string of 23 (or possibly more) binary zeros followed by a binary one. The start code ID identifies the type of data that follows as shown in Table 1 below. A number of "extensions" are also permitted at various points in the video stream. Each extension begins with an extension start code followed by one of the predetermined Extension IDs, which are listed in Table 2 below.

TABLE 1

| START CODE TYPE | START CODE ID (8 bits) |
|---|---|
| Picture_start_code | 00 |
| Slice_start_code | 01 to AF |
| User_data_start_code | B2 |
| Sequence_header_code | B3 |
| Sequence_error_code | B4 |
| Extension_start_code | B5 |
| Sequence_end_code | B7 |
| Group_start_code | B8 |
| Reserved | B0, B1, B6 |

TABLE 2

| Extension_ID (4 bits) | Name |
|---|---|
| 1 | Sequence extension |
| 2 | Sequence display extension |
| 3 | Quant Matrix Extension |
| 4 | Copyright Extension |
| 5 | Sequence Scalable Extension |
| 7 | Picture Display Extension |
| 8 | Picture Coding Extension |
| 9 | Picture Spatial Scalable Extension |
| A | Picture Temporal Scalable Extension |
| 0, 6, B to F | Reserved |

Figure 23:
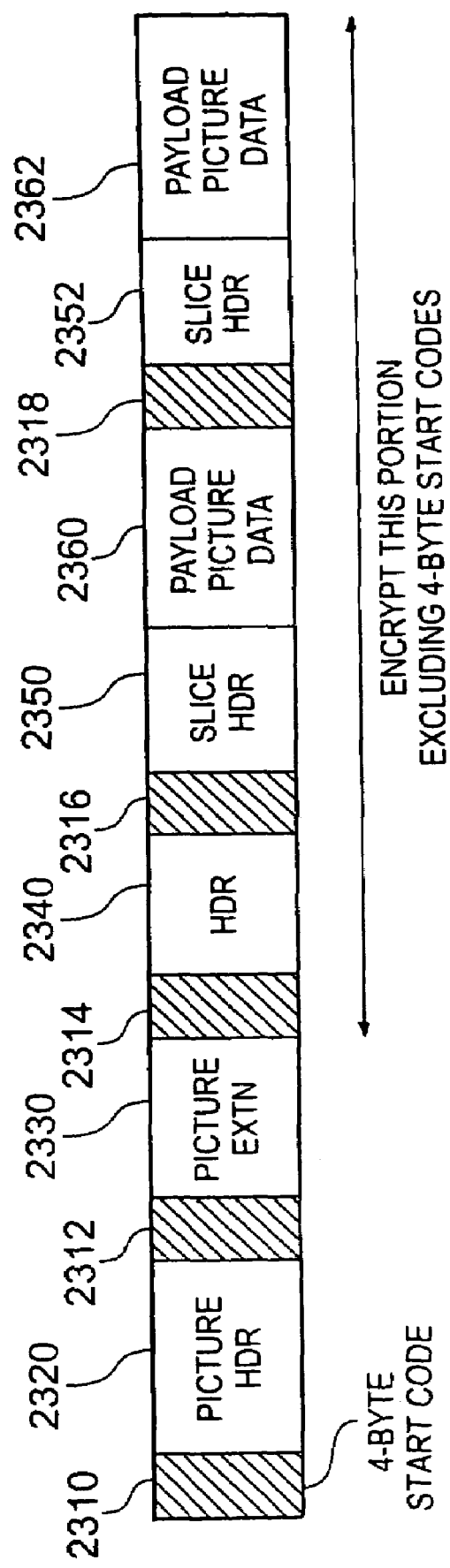
FIG. 23 schematically illustrates selective encryption of predetermined portions of a video stream.

To enable the frame boundaries to be identified in the MPEG2 video stream the data is selectively encrypted so that the frame boundaries are identifiable in the encrypted data stream. FIG. 23 schematically illustrates selective encryption of predetermined portions of a video stream. The data stream comprises a number of 4-byte header IDs or "start codes" 2310, 2312, 2316 and 2318 followed by associated headers of variable length. The 4 byte start codes in this embodiment are hexadecimal strings but they could alternatively be decimal or octal strings for example. For MPEG the start code string length should be 4 bytes (or 32 bits that are byte-aligned).

The 1-byte start code IDs within the header IDs identify the type of the header as indicated in Table 1 above. The picture payload data portions 2360, 2362 immediately follow the slice headers 2350, 2352. Each image frame comprises a plurality of slices. The picture header 2320 and picture extension 2330 give information about the frame boundaries. Accordingly, the portion of the video stream to be encrypted excludes the picture header 2320 and the picture extension 2330 but the remaining headers and picture data are allocated for encryption. The encryption engine detects the header ID 2310 that precedes the picture header 2320 and does not perform encryption on a predetermined number of data bits following the header ID. This particular embodiment identifies a predetermined number of data bits following the header and does not perform encryption in these identified data bits. However in an alternative embodiments the number of data bits following the header is determined at the time of processing, for example by parsing the header to determine its exact length. Similarly when the header ID 2312 that precedes the picture extension 2330 is detected by the encryption engine, the encryption process does not encrypt a predetermined number of bytes following that header. Since the picture header 2320 and picture extension 2330 are of variable length whereas a predetermined number of bits are skipped (not encrypted) it is possible that the unencrypted portion of the data stream may extend into the picture data of, for example the first slice of picture data. Since the format identifying portion of the data (in this case the frame boundary data) is derivable from the unencrypted picture header and picture extension the remaining data of the stream may be allocated for encryption i.e. the header 2340, slice headers 2350, 2352 and payload picture data portions 2360, 2362. The data other than the frame boundary data may be categorised as the payload data. However, note that none of the associated header IDs 2314, 2316, 2318 are encrypted. The encryption is performed so as to ensure that a bit sequence that corresponds to one of the predetermined header IDs is not inadvertently generated since this could adversely affect the frame boundary identification i.e. false frame boundaries could be inadvertently introduced at the decoder. An encryption stream that avoids generation of header ID sequences is described in UK Patent Application Number 0128887.7 (Publication Number GB2382753) "Encrypting video data ensuring that all encrypted data values lie in a legal range". The selective encryption of the data stream allows an MPEG2 video decoder/player to replay both encrypted and decrypted subsections of the data stream without introducing frame boundary errors.

The selectively encrypted data stream is decrypted using a decryption apparatus that has a discriminator operable to discriminate between the format identifying portion (e.g. frame boundary data) and the encrypted payload portion of the input data. The decryption apparatus is responsive to the output of the discriminator and processes the input data so that the format-identifying portion is not decrypted but at least a part of the encrypted payload portion may be decrypted.

Although the digital rights management system according to the present technique has been described above primarily in relation to data encryption and visible watermarking techniques it is also applicable to other forms of image manipulation such as fragile watermarking, Unique Material ID (UMID) watermarking and fingerprinting.

The above-described techniques may be implemented at least in part by computer program(s) running on data processor devices within the recording/reproduction equipment or on the RMD, for example, the encryption and decryption processes may be implemented by computer software. The software could be provided either a storage medium such as a CD-ROM or floppy disk. Alternatively the software could be transmitted to the equipment via a computer network (e.g. downloaded from the Internet).

Figure 24:
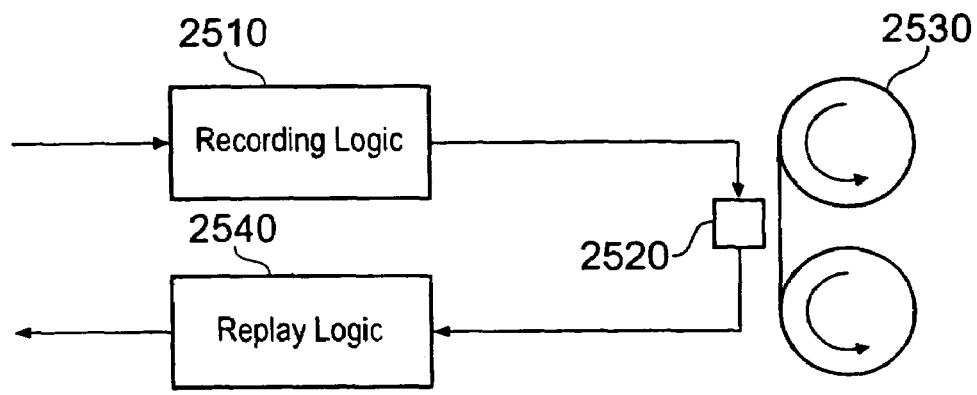
FIG. 24 is a schematic diagram of a tape recording/reproducing apparatus.

FIG. 24 is a schematic diagram of a recording/reproducing apparatus. The apparatus comprises recording logic 2510 which receives a signal for recording and processes and formats it into an appropriate data format to be recorded; a recording head arrangement 2520 such as a rotary head (helical scan) arrangement; a linear-access recording medium 2530 such as a magnetic tape medium; and replay logic 2540 for receiving signals from the head arrangement 2520 and processing and formatting them into an output signal.

The use of this recording/reproducing apparatus for handling encrypted content will now be described.

In the access control arrangements described earlier, compressed audio/video signals are encrypted using content keys. The encryption is handled in such a way that the header information present within the MPEG data stream is not lost. This allows each frame of data to be identified in the encrypted data stream. It will be assumed that a similar arrangement is used in the present apparatus, although other arrangements could of course be used instead.

Again, in the arrangements described above, an "access package" containing (for example) encrypted content keys is set up. This is required if a user wishes to decrypt the video content on reproduction from the recording medium.

Rather than recording the encrypted video content and the access package on a random access storage medium such as a disk, these items may be recorded on the linear access recording medium 2530 of FIG. 24. Various ways of achieving this will now be described.

Figure 25:
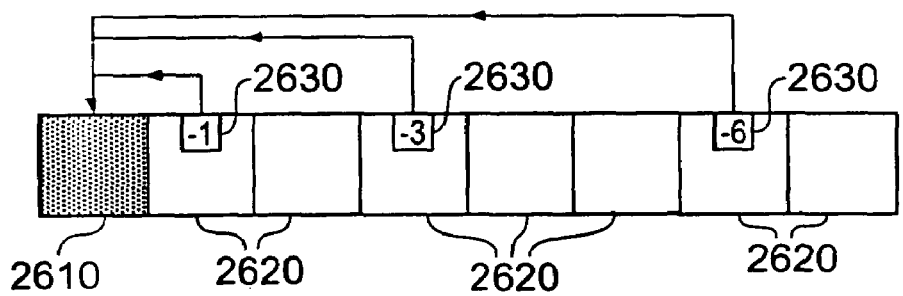
FIGS. 25, 26 and 27 each schematically illustrate a series of video frames recorded onto a tape.
Figure 26:
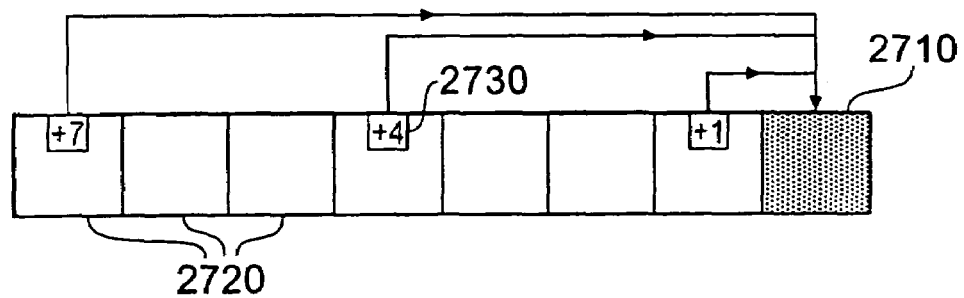
Figure 27:
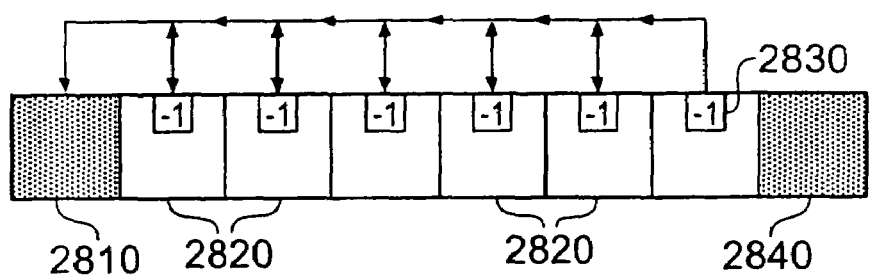

FIGS. 25, 26 and 27 each schematically illustrate a series of video frames recorded onto the medium 2530.

In FIG. 25, the access package containing (amongst other things) the encrypted content keys, is recorded as a "dummy" frame 2610. This is shown as a shaded area in the schematic diagram of FIG. 25. The access package is recorded first and then successive frames of video data 2620 are recorded afterwards. At least some of the frames 2620 contain pointers 2630 indicating the location of the access package 2610 in the sequence of frames. In the arrangement shown in FIG. 25, the pointers indicate a relative position, expressed as a number of frames, between the frame containing the pointer and the access package. This relative addressing arrangement has the advantage that it is independent of the position on the tape at which the sequence is recorded.

It is possible that each frame or video data may have an associated pointer to the access package, or alternatively a subset of one or more of the frames may have such a pointer. Of course, an absolute address could be used, for example if the tape were "pre-striped" with frame-resolution time code. Unique or quasi-unique material identifiers such as SMPTE UMIDs (optionally embedded in the content as watermarks) may also provide suitable absolute addresses.

An advantage of recording the access package first (before the encrypted content data) applies to recording arrangements such as camera-recorders (camcorders) where audio/video data is captured and recorded in substantially real time. When a camcorder is in use, at any particular time during a recording it is not known when the recording process will finish. So, a pointer which points backwards to a dummy frame containing the access package recorded at the beginning of the sequence is convenient, whereas a forward pointer to a dummy frame part-way through of at the end of the sequence would be difficult to implement, probably requiring an after-recording stage to modify the recorded frames.

However, in other recording arrangements such as editing or mastering apparatus, it may indeed be known at the outset how long the current recording sequence is to be. In such cases, the access package could be placed part way through or at the end of the sequence, and pointers could be recorded with each frame so as to point forward to the access package. FIG. 26 shows an access package 2710 at the end of a recorded sequence of frames 2720. The pointers accompanying at least some (and possible all) of the recorded frames 2730 point forward to the access package 2710.

FIG. 27 schematically illustrates a further arrangement in which a "main" access package 2810 is recorded at the beginning of a recorded sequence of frame 2820. Pointers 2830 point back to the main access package. A "reserve" access package 2840 is also recorded at the end of the sequence. The idea of the reserve access package is that the recorded material can still be accessed, even if there is tape damage at the tape position at which the main access package is recorded.

FIG. 27 also illustrates a further possibility of relative addressing, in that each frame points to a previous frame to form an address chain of links 2830 leading back to the main access package 2810.

Figure 28:
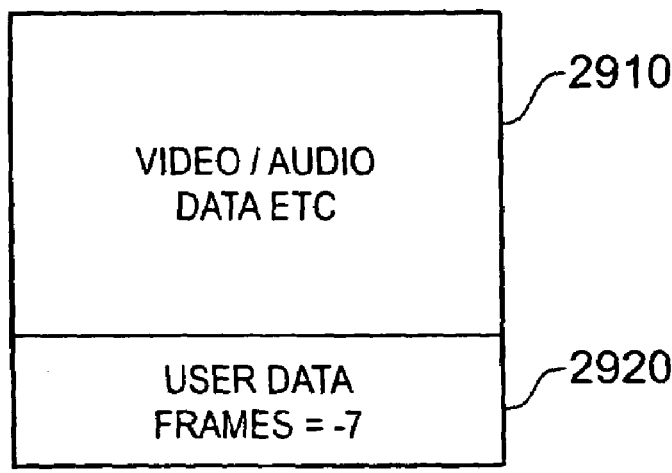
FIG. 28 schematically illustrates a video frame.

FIG. 28 schematically illustrates a video frame as recorded on the medium 2530. Most video tape recording formats include metadata "user bits" with each frame to allow user data to be recorded. It is these user bits which form the ideal place in which to store the pointers 2630, 2730 or 2830. So, in FIG. 28, the video and optional audio data are stored in a payload section 2910 of the frame on tape, and the pointer is stored in the user bits section 2920 of the frame.

Figure 29:
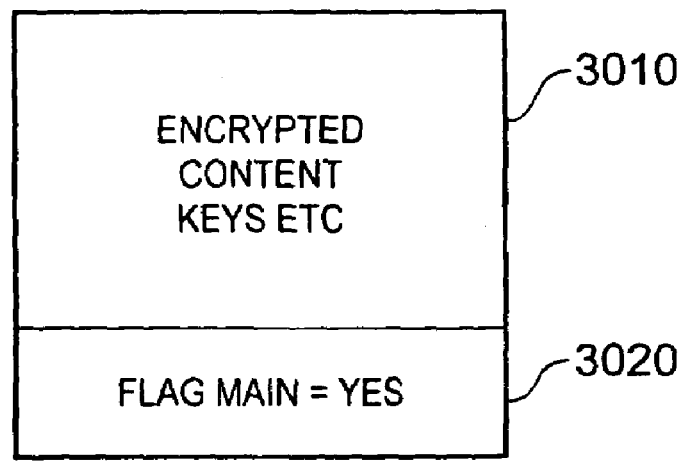
FIGS. 29 and 30 schematically illustrate data access package formats.
Figure 30:
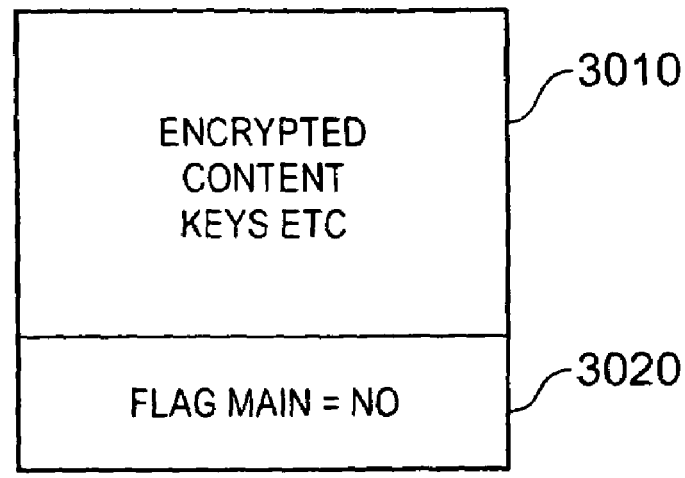

FIGS. 29 and 30 schematically illustrate data access package formats. The data access package is stored in one or more "dummy" frames, i.e. in the same overall data format as one of the video frames, with the encrypted content keys etc being stored within the payload section of a video frame. This is particularly convenient as it allows the same recording processes to be applied to access package as would be applied to a video frame. In other words, this reduces the degree of modification which is required to a video tape recording/reproducing apparatus. Optionally, for use with the arrangement of FIG. 27, a flag indicating whether or not the access package is the "main" access package for that sequence may be stored in the user bits 3020.

Figure 31:
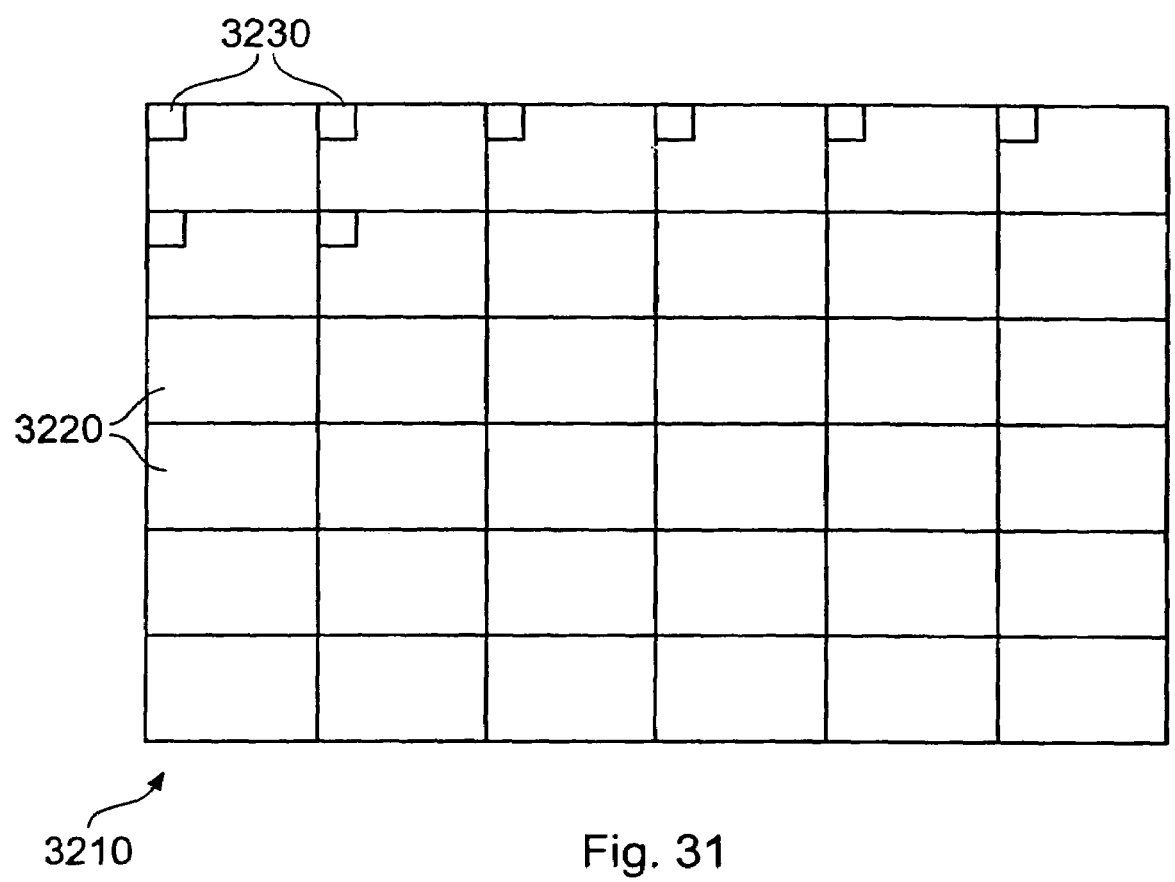
FIG. 31 schematically illustrates a dummy video frame.

Finally, FIG. 31 schematically illustrates a dummy video frame 3210.

This example of a video frame stores compressed video data relating to spatial frequency components of the image as a series of image regions 3220. The regions may be so-called macro blocks, so-called slices or other regions. Within each such region, a data area 3230 is reserved for the lowest spatial frequency (so-called "DC") part of the compressed data. The present embodiment uses this area to store the encrypted content keys and other parts of the access package. An advantage of this is that many tape formats apply more careful processing to the DC data because it is so important to the successful reproduction of a conventional video image. The more careful processing may involve a higher degree of error detection and correction processing and/or the storage of the DC data on a less error-prone area of the tape such as a central area of the tape.

The access package may require greater storage capacity than is provided by the DC coefficients for a single frame. A data access package may therefore span a number of dummy frames. In such a case, pointers may, for example, address the first dummy frame representing the access package.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data encryption apparatus operable to apply encryption to video stream input data having at least a format identifying portion and a payload portion, said apparatus comprising:
   a discriminator to discriminate between said format identifying portion of said input data and said payload portion of said input data; and
   an encryptor to selectively apply encryption to said input data in dependence upon an output of said discriminator so as to encrypt at least a part of said payload portion of said input data but not to encrypt said format identifying portion.

2. Apparatus according to claim 1, in which said format identifying portion occurs repetitively through said input data.

3. Apparatus according to claim 2, in which said format identifying portion identifies at least picture boundaries.

4. Apparatus according to claim 3, in which said video data conforms to an MPEG compression standard.

5. Apparatus according to claim 3, in which said format identifying portion comprises at least MPEG picture headers.

6. Apparatus according to claim 2, in which encryption is applied to some but not all of said video pictures.

7. Apparatus according to claim 2, in which, in respect of those pictures which are encrypted, encryption is applied to some but not all of each picture.

8. Apparatus according to claim 2, in which, in respect of at least some of said pictures, a first encryption scheme is applied to some but not all of each picture, and a second encryption scheme is applied to at least the remainder of each picture.

9. Apparatus according to claim 8 in which said first encryption scheme is visible watermarking and said second encryption scheme is symmetric or asymmetric encryption.

10. Apparatus according to claim 9, in which said encryptor is operable not to generate said one or more predetermined data patterns within said encrypted payload data.

11. Apparatus according to claim 1, in which said discriminator is operable to identify one or more predetermined data patterns within said input data.

12. Data encryption/decryption apparatus comprising encryption apparatus according to claim 1 and decryption apparatus operable to apply decryption to video stream input data having at least an unencrypted format identifying portion and an encrypted payload portion, said apparatus comprising:
   a discriminator to discriminate between said format identifying portion of said input data and said encrypted payload portion of said input data;
   a decryptor to selectively apply decryption to said input data in dependence upon an output of said discriminator so as to decrypt at least a part of said payload portion of said input data but not to decrypt said format identifying portion.

13. Apparatus according to claim 1, in which said apparatus comprises an audio and/or video capture, processing or output apparatus.

14. A data decryption apparatus operable to apply decryption to video stream input data having at least an unencrypted format identifying portion and an encrypted payload portion, said apparatus comprising:
   a discriminator to discriminate between said format identifying portion of said input data and said encrypted payload portion of said input data;
   for a decryptor to selectively apply decryption to said input data in dependence upon an output of said discriminator so as to decrypt at least a part of said payload portion of said input data but not to decrypt said format identifying portion.

15. A data encryption method for applying encryption to video stream input data having at least a format identifying portion and a payload portion, said method comprising the steps of:
   discriminating between said format identifying portion of said input data and said payload portion of said input data; and
   selectively applying encryption to said input data in dependence upon said discrimination so as to encrypt at least a part of said payload portion of said input data but not to encrypt said format identifying portion.

16. A computer readable medium encoded with computer program instructions which cause a data processor to execute the method according to claim 15.

17. A data decryption method for applying decryption to video stream input data having at least an unencrypted format identifying portion and an encrypted payload portion, said method comprising the steps of:
   discriminating between said format identifying portion of said input data and said encrypted payload portion of said input data;
   a decryptor to selectively apply decryption to said input data in dependence upon said discrimination so as to decrypt at least a part of said payload portion of said input data but not to decrypt said format identifying portion.

* * * * *